US008144145B2

(12) United States Patent
Morita

(10) Patent No.: US 8,144,145 B2
(45) Date of Patent: Mar. 27, 2012

(54) INTEGRATED CIRCUIT DEVICE AND ELECTRONIC EQUIPMENT

(75) Inventor: Akira Morita, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 385 days.

(21) Appl. No.: 12/548,800

(22) Filed: Aug. 27, 2009

(65) Prior Publication Data

US 2010/0053145 A1 Mar. 4, 2010

(30) Foreign Application Priority Data

Sep. 3, 2008 (JP) ................................ 2008-226369
Jul. 7, 2009 (JP) ................................ 2009-160785

(51) Int. Cl.
*G06F 3/038* (2006.01)

(52) U.S. Cl. ............ 345/213; 345/98; 345/80; 345/211; 345/210

(58) Field of Classification Search ........................ None
See application file for complete search history.

(56) References Cited

U.S. PATENT DOCUMENTS 6,366,065 B1 4/2002 Morita
7,583,261 B2 * 9/2009 Shirasaki et al. ............ 345/212
7,952,379 B2 * 5/2011 Kwak .................... 324/760.02
2009/0115772 A1 * 5/2009 Shiomi et al. ................ 345/214

FOREIGN PATENT DOCUMENTS

JP A-2002-108298 4/2002
JP B2-3405333 5/2003

* cited by examiner

*Primary Examiner* — Muhammad N Edun
(74) *Attorney, Agent, or Firm* — Oliff & Berridge, PLC

(57) ABSTRACT

An integrated circuit device includes: a plurality of data line driving circuits that drive a plurality of data voltage supply lines; and a correction data calculation section that calculates correction data for correcting differences in data voltages outputted from the plurality of data line driving circuits, wherein the correction data calculation section executes, in one horizontal scanning period in a non-display period in a vertical scanning period, a first mode to obtain the correction data corresponding to a data line driving circuit to be corrected among the plurality of data line driving circuits.

12 Claims, 17 Drawing Sheets

INTEGRATED CIRCUIT DEVICE AND ELECTRONIC EQUIPMENT

The entire disclosure of Japanese Patent Application No. 2008-226369, filed Sep. 3, 2008 and Japanese Patent Application No. 2009-160785, filed Jul. 7, 2009 are expressly incorporated by reference herein.

BACKGROUND

1. Technical Field

An aspect of the present invention relates to integrated circuit devices and electronic equipment.

2. Related Art

High definition imaging technology, such as, high-vision imaging technology has become popular in recent years, and with such a technological trend, higher definition and greater multi-grayscale displays have been achieved in display equipment (electronic equipment) such as liquid crystal projectors and the like. Such display equipment with greater multi-grayscale requires analog circuits with high accuracy in their drivers to drive liquid crystal panels (electro-optical panels).

Concretely, the greater the number of grayscale levels, the smaller the grayscale voltage for each grayscale level, such that the grayscales would not be correctly presented if a slight error occurs in the driving voltage of the driver. For example, when an offset difference is present in the operation amplifiers that drive adjacent ones of data voltage supply lines (data lines, source lines), a difference occurs in the voltages on the adjacent data voltage supply lines, which may be viewed as a vertical line on the displayed image. In this respect, drivers that are used for display equipment with multiple grayscales need to address an issue of accurately outputting data voltages.

In order to address the issue described above, for example, Japanese patent 3405333 (Patent Document 1) describes a method for improving the accuracy in data voltages through driving data voltage supply lines by operation amplifiers and then by DAC outputs. According to this method, by driving the data voltage supply lines with DAC outputs, occurrence of differences in data voltages due to offsets of the operation amplifiers can be prevented.

However, the higher the definition of a liquid crystal panel, the faster the drive data voltage supply lines need to be driven. The method described in Patent Document 1 uses DAC outputs with higher output impedance, compared to those of the operation amplifiers, and therefore entails a problem in that it takes a relatively long time for each data voltage to reach a desired grayscale voltage.

On the other hand, Japanese Laid-open Patent Application 2002-108298 (Patent Document 2) describes a method for correcting unevenness in the display of a liquid crystal projector, through generating correction data stored in a RAM in an interpolation operation and adding the generated correction data to picture data. According to this method, by correcting display data by digital processing, data voltages can be accurately outputted, and high-speed driving by operation amplifiers with high driving power is possible.

However, the characteristics of liquid crystal panels and drivers deteriorate with passing of time after having been shipped out. Also, the characteristics would change due to heat generated by the display equipment such as projector lamps or the like. The method described in Patent Document 2 uses correction data adjusted at the time of manufacturing liquid crystal panels for the correction, and therefore entails a problem in that changes in the characteristics that occur after shipping cannot be accommodated.

SUMMARY

In accordance with an advantage of some aspects of embodiments of the present invention, it is possible to provide integrated circuit devices and electronic equipment that are capable of correcting differences in data voltages in real-time.

An embodiment of the invention pertains to an integrated circuit device having a plurality of data line driving circuits that drive a plurality of data voltage supply lines; and a correction data calculation section that obtains correction data for correcting differences in data voltages to be outputted from the plurality of data line driving circuits, wherein the correction data calculation section executes, in one horizontal scanning period in a non-display period in a vertical scanning period, a first mode to obtain the correction data corresponding to a data line driving circuit to be corrected among the plurality of data line driving circuits.

According to the embodiment of the invention described above, the correction data calculation section executes the first mode in one horizontal scanning period in a non-display period in a vertical scanning period, thereby obtaining correction data for correcting differences in data voltages to be outputted from the plurality of data line driving circuits.

According to the embodiment of the invention described above, correction data for correcting differences in data voltages to be outputted from the data line driving circuits are obtained. By this, even when the data line driving circuits have differences in data voltages due to manufacturing-derived differences, data voltages corresponding to image data can be outputted with high accuracy and the image quality can be improved. Also, in accordance with the embodiment of the invention, the first mode is executed in one horizontal scanning period in a non-display period in a vertical scanning period. As a result, correction data can be calculated in real time, and deterioration of the image quality can be prevented even when the output characteristics of the data line driving circuits change due to heat or other external factors. Furthermore, by executing the first mode in non-display periods, correction data can be calculated without affecting image display.

In accordance with an aspect of the embodiment of the invention, the integrated circuit device may include a plurality of correction circuits, each of which corrects image data based on the correction data given from the correction data calculation section, and outputs correction-processed image data to a corresponding data line driving circuit among the plurality of data line driving circuits.

According to the aspect of the invention described above, the plurality of correction circuits correct image data based on correction data, and the plurality of data line driving circuits output corresponding data voltages in response to the image data after the correction processing. Accordingly, differences in data voltages that are outputted from the data line driving circuits can be corrected based on the correction data.

In accordance with an aspect of the embodiment of the invention, the plurality of correction circuits may include correction data registers capable of retaining the correction data given from the correction data calculation section, wherein initial values of the correction data corresponding to the plurality of data line driving circuits may be set at the correction data registers before execution of the first mode, and the plurality of correction circuits may correct the image data based on the initial values of the correction data.

By this, the image data can be corrected based on the initial values even during a period until correction data are calculated by the first mode. For this reason, the image display can be started in a state in which differences in data voltages are corrected, and therefore the image quality at the start of image display can be improved.

In accordance with an aspect of the embodiment of the invention, the correction data calculation section may execute, in a display preparation period, a second mode in which initial values of the correction data corresponding to the plurality of data line driving circuits are obtained in a batch and set at the correction data registers, and may execute the first mode after executing the second mode.

By this, initial values can be set before calculation of correction data by the first mode. Also, as initial values are obtained during the display preparation period, the initial values of the correction data can be calculated without affecting image display. Then, by executing the first mode after the second mode, differences in data voltages can be corrected in real time.

In accordance with an aspect of the embodiment of the invention, the correction data calculation section may obtain the initial values of the correction data in a batch by executing the second mode at the time of system startup.

According to the aspect of the embodiment of the invention described above, the second mode is executed at the time of starting up the system, which is a display preparation period. By this, the image can be displayed in a state in which differences in data voltages are corrected even immediately after starting up the system.

Also, in accordance with an aspect of the embodiment of the invention, the correction data calculation section may execute the second mode to obtain initial values of the correction data in a batch at the time of switching a display mode.

According to the aspect of the embodiment of the invention described above, the second mode is executed at the time of switching a display mode, which is a display preparation period. By this, the image can be displayed in a state in which differences in data voltages are corrected even immediately after the display mode has been switched.

In accordance with an aspect of the embodiment of the invention, in the first mode and the second mode, the correction data calculation section may sequentially change measurement data and output the measurement data to the data line driving circuit to be corrected, the data line driving circuit to be corrected may output data voltages corresponding to the measurement data, and the correction data calculation section may obtain the correction data based on the data voltages corresponding to the measurement data; and in a normal operation mode, the correction circuit may correct image data based on the correction data and output correction-processed image data to the corresponding data line driving circuit among the plurality of data line driving circuits.

According to the aspect of the embodiment of the invention described above, in the first mode and the second mode, the correction data calculation section sequentially changes measurement data, the data line driving circuit to be corrected outputs data voltages that sequentially change in response to the sequentially changing measurement data, and the correction data calculation section obtains correction data based on the sequentially changing data voltages. In this manner, according to the present embodiment of the invention, correction data that reflect differences in data voltages outputted from the data line driving circuits can be obtained.

Also, in accordance with an aspect of the present embodiment of the invention, in the first horizontal scanning period among a plurality of horizontal scanning periods in the non-display period or the display preparation period, the plurality of data voltage supply lines are set at a predetermined voltage, and in the second horizontal scanning period succeeding the first horizontal scanning period among the plurality of horizontal scanning periods in the non-display period or the display preparation period, the correction data calculation section may obtain the correction data.

According to the aspect of the embodiment of the invention described above, the data voltage supply lines, which output various data voltages, are set at a predetermined voltage before correction data are calculated. By this, differences in data voltages can be measured, starting from the same data voltage every time when the calculation of correction data is started, whereby accurate correction data can be calculated.

In accordance with an aspect of the embodiment of the invention, the correction data calculation section may, in the first mode or the second mode, multiply the obtained correction data by an adjustment coefficient to obtain coefficient-multiplied correction data, and the plurality of correction circuits may, in the normal operation mode, correct image data based on the coefficient-multiplied correction data.

Accordingly, the correction data calculated are adjusted by an adjustment coefficient, whereby accurate correction data can be obtained. Even when correction data is not accurately calculated due to, for example, insufficient drivability of a data line driving circuit, the correction data can be rectified by the adjustment coefficient, whereby accurate correction data can be obtained.

Also, in accordance with an aspect of the embodiment of the invention, the correction data calculation section may use, in the first mode, presently obtained correction data and previously obtained correction data for the data line driving circuit to be corrected, to obtain correction data to be outputted to a correction circuit corresponding to the data line driving circuit to be corrected among the plurality of correction circuits.

According to the aspect of the embodiment of the invention described above, correction data is calculated, using currently obtained correction data and previously obtained correction data. Therefore, even when differences in data voltages are not accurately measured due to noise or other influences, the use of the previously obtained correction data can prevent the presently obtained data from becoming inaccurate.

Also, in accordance with an aspect of the embodiment of the invention, when the presently obtained correction data is greater than the previously obtained correction data, the correction data calculation section may add a predetermined positive value to the previously obtained correction data to obtain the correction data, and when the presently obtained correction data is smaller than the previously obtained correction data, the correction data calculation section may add a predetermined negative value to the previously obtained correction data to obtain the correction data to be outputted to the correction circuit.

In this manner, the amount of change in correction data is limited within a predetermined range of positive or negative values by using the previously calculated correction data. By this, abrupt changes in correction data can be suppressed, and deterioration of the image quality can be prevented even when differences in data voltages cannot be accurately measured due to noise or other influences.

Another embodiment of the invention pertains to electronic equipment that includes any one of the integrated circuit devices described above.

DESCRIPTION OF EXEMPLARY EMBODIMENTS

Preferred embodiments of the invention are described below in detail. It is noted that embodiments to be described below would not unduly limit contents of the invention described in the scope of the patent claims, and it should be noted that not all of the components described in accordance with the embodiments would necessarily be essential as means for solution provided by the invention.

1. Data Voltage Correction Circuit 1.1. Exemplary Structure

Figure 1:
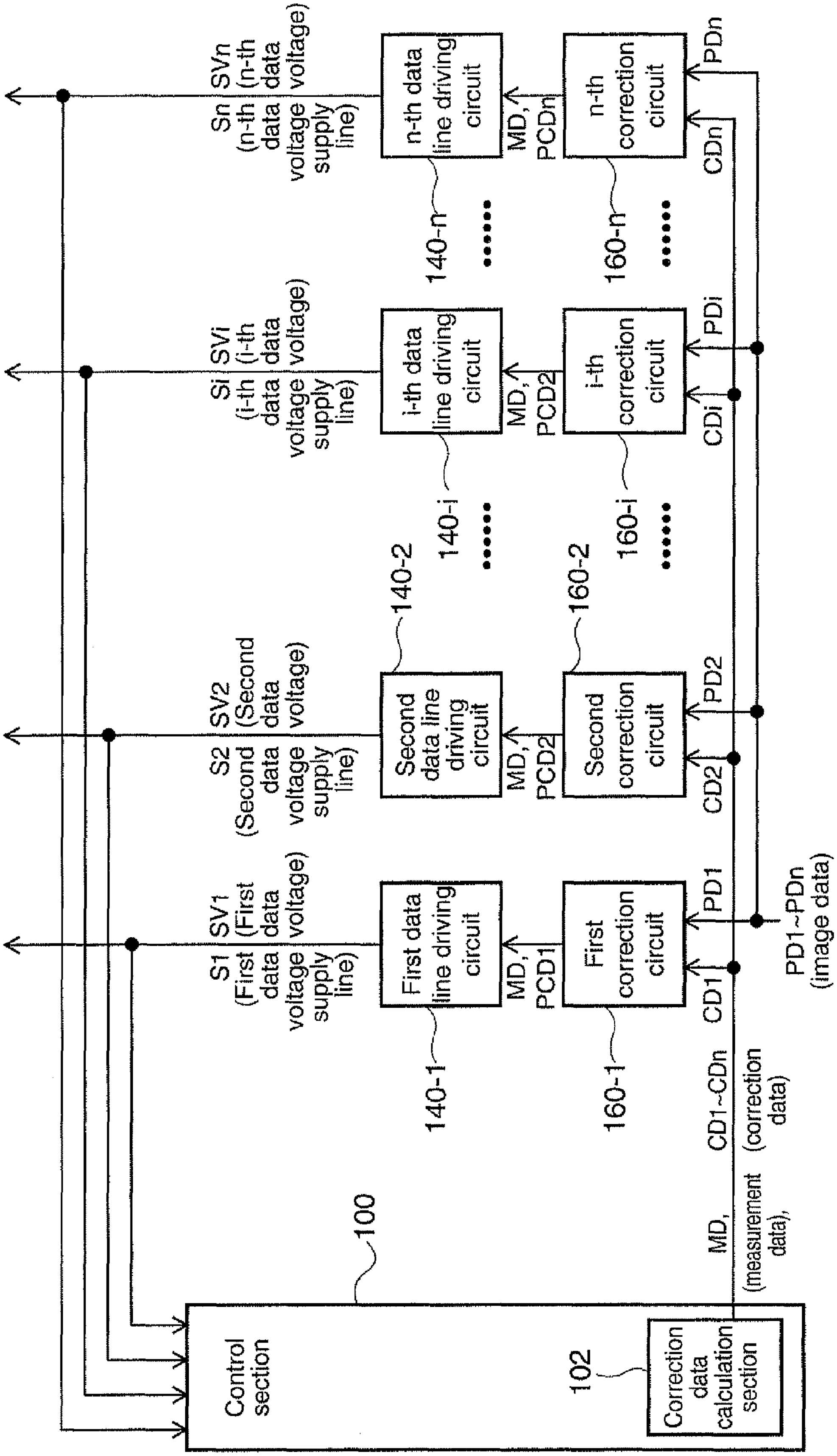
FIG. 1 shows an example of the basic structure of an embodiment of the invention.

FIG. 1 shows an example of the basic structure of the embodiment. The exemplary structure shown in FIG. 1 includes the first through n-th data line driving circuits 140-1 through **140-*n* (a plurality of data line driving circuits), correction circuits 160-1 through 160-*n* (a plurality of correction circuits), and a control section 100. The control section 100 includes a correction data calculation section 102**. It is noted that it is possible to make many changes, such as, omitting a portion of the components, adding other components, changing connections between components, and the like.

The data line driving circuits 140-1 through **140-*n* drive data voltage supply lines S1 through Sn (a plurality of data voltage supply lines). Concretely, the data line driving circuits 140-1 through 140-*n* output data voltages SV1 through SVn (a plurality of data voltages) to drive the corresponding data voltage supply lines S1 through Sn, respectively. For example, the data line driving circuits 140-1 through 140-*n* output data voltages SV1 through SVn corresponding to correction-processed image data PCD1 through PCDn to the data voltage supply lines S1 through Sn, respectively. Alternatively, the data line driving circuits 140-1 through 140-*n* output data voltages SV1 through SVn corresponding to measurement data MD outputted from the correction data calculation section 102 onto the data voltage supply lines S1** through Sn, respectively.

The correction data calculation section 102 obtains correction data CD1 through CDn for correction of differences (deviations, errors) in the data voltages SV1 through SVn. Concretely, the correction data calculation section 102 obtains correction data corresponding to data line driving circuits to be corrected (hereafter referred to as correction data to be used for calculation target) among the data line driving circuits 140-1 through **140*n*. More concretely, a part of correction data among the correction data CD1 through CDn is obtained as correction data to be used for calculation target in one round of the correction data calculation, and the correction data calculation is repeated to obtain the correction data CD1** through CDn.

For example, the correction data calculation section 102 executes a 1H mode to obtain correction data CD1 through CDn. It is noted here that the 1H mode is a first mode. More specifically, the 1H mode is a mode to obtain correction data to be used for calculation target among correction data CD1 through CDn. Concretely, the correction data calculation section 102 executes the 1H mode in one horizontal scanning period in a non-display period in a vertical scanning period (frame). Then, correction data to be used for calculation target are calculated in the 1H mode in each of the vertical scanning periods. For example, as described below with reference to FIG. 9, one piece of correction data is calculated in one vertical scanning period as correction data to be used for calculation target, and n pieces of correction data CD1 through CDn are calculated in n vertical scanning periods.

The correction circuits 160-1 through **160-*n* correct image data PD1 through PDn based on the correction data CD1 through CDn, respectively, and outputs correction-processed image data PCD1 through PCDn. Concretely, the correction circuits 160-1 through 160-*n* correct differences in data voltages SV1 through SVn through correcting the image data PD1 through PDn based on the correction data CD1 through CDn. For example, when the image data PD1 through PDn have the same grayscale, image data PD1 through PDn are corrected such that the luminance of pixels corresponding to the respective image data becomes uniform, thereby correcting differences in data voltages SV1 through SVn to be outputted from the data line driving circuits 140-1 through 140-*n***.

Figure 9:
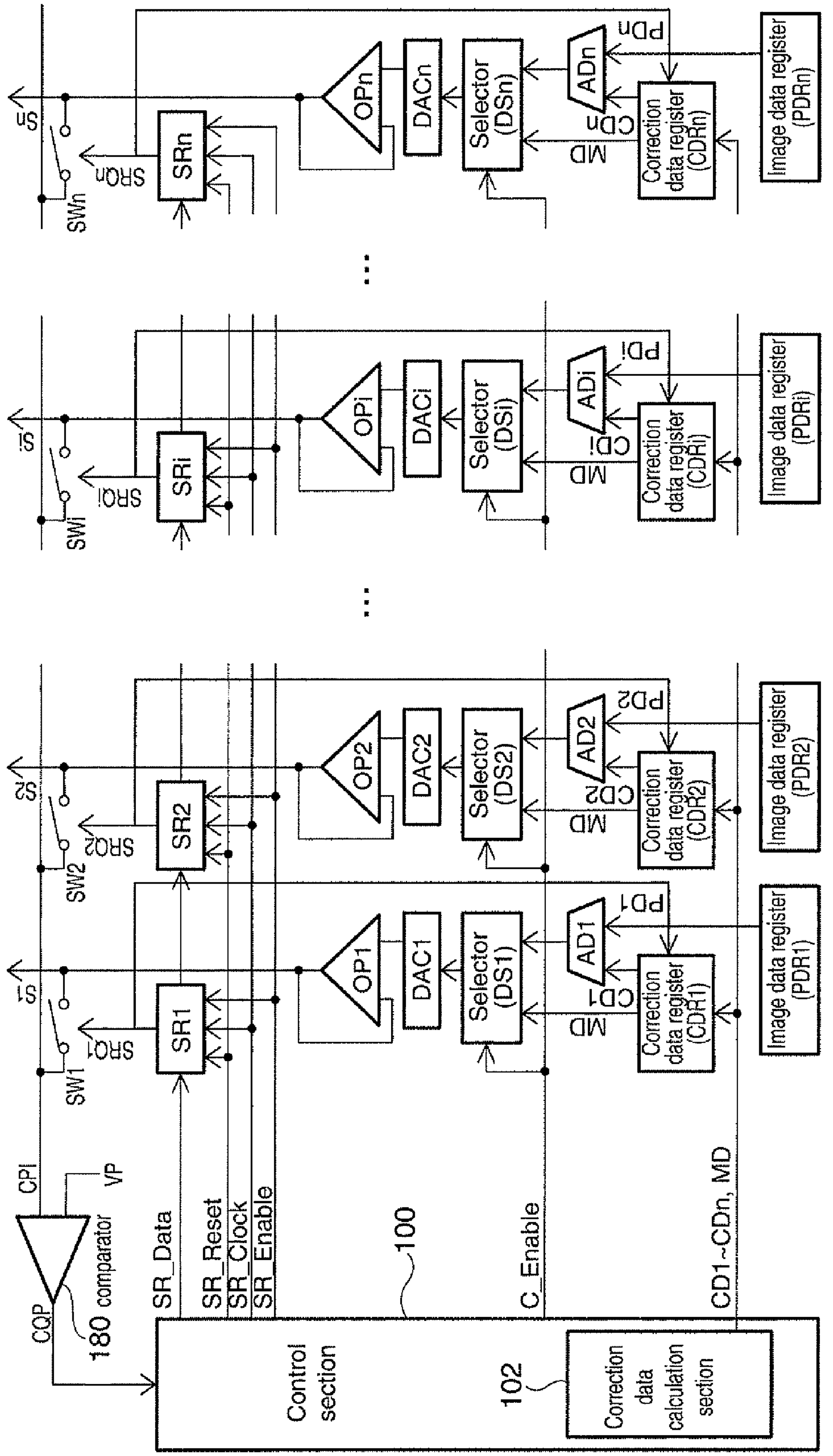
FIG. 9 is a structure example of the embodiment of the invention in detail.

Furthermore, the correction circuits 160-1 through **160-*n* may include correction data registers (for example, correction data registers CDR1 through CDRn shown in FIG. 9) for retaining correction data CD1 through CDn. Initial values of correction data CD1 through CDn are set at the correction data registers before the present embodiment executes the 1H mode. For example, initial values of correction data CD1 through CDn may be set from a unshown host controller, such as, a central processing unit (CPU), or initial values of correction data CD1 through CDn that are obtained through executing the burst mode by the correction data calculation section 102 may be set. The correction circuits 160-1 through 160-*n* correct image data PD1 through PDn based on the initial values of the correction data CD1** through CDn.

It is noted that the burst mode is the second mode. In other words, the burst mode is a mode in which the correction data calculation section 102 obtains initial values of correction data CD1 through CDn in a batch in a display preparation period. Concretely, in one vertical scanning period in a display preparation period, correction data to be used for calculation target are calculated in a plurality of horizontal scanning periods in the one vertical scanning period, and initial values of correction data CD1 through CDn are obtained in a batch in the one vertical scanning period. For example, as described below with reference to FIG. 11, an initial value of one piece of correction data is obtained as correction data for calculation target in one horizontal scanning period, and this operation is repeated n times within one vertical scanning period to obtain initial values of n pieces of correction data CD1 through CDn.

The control section 100 controls operations of the components of the present embodiment. Concretely, the control section 100 controls operation timings in the 1H mode and in the burst mode. Also, the operation section 100 controls operation timings in a normal operation mode to be described below. For example, as described below with reference to FIG. 9, the control section 100 controls timings of calculating correction data DC1 through CDn, using a sequencer 240, a counter section 200 and the like.

In accordance with the present embodiment, the correction data calculation section 102 calculates correction data CD1 through CDn for correcting differences in data voltages SV1 through SVn. By this, the data line driving circuits 140-1 through 140*n* can output highly accurate data voltages, and therefore the image quality can be improved. Concretely, the present embodiment executes the 1H mode to calculate correction data CD1 through CDn. By this, differences in data voltages SV1 through SVn can be corrected in real time. Also, the present embodiment executes the burst mode to obtain initial values of correction data CD1 through CDn. By this, for example, the initial values are obtained in a display preparation period, such as, for example, at the time of power-on, and image display can be started in a state in which differences in data voltages SV1 through SVn are corrected.

1.2. Exemplary Structures

As an example of application of the embodiment of the invention, the case where a liquid crystal panel (an electro-optical panel in a broader sense) is driven by the embodiment shall be described. As liquid crystal panels, active matrix type panels that use switching elements, such as, for example, TFTs (Thin Film Transistors), TFDs (Thin Film Diodes) and the like, and simple matrix type panels can be used. However, it should be noted that the present invention is also applicable to cases of driving electro-optical panels other than liquid crystal panels. For example, the present invention is applicable in driving display panels that use self-emission elements, such as, for example, organic EL (Electro Luminescence) and inorganic EL elements.

For the sake of simplification of description to be made below, common features in the 1H mode and the burst mode shall be described, using the terms "correction data calculation mode" as indicating the 1H mode and the burst mode.

Figure 2:
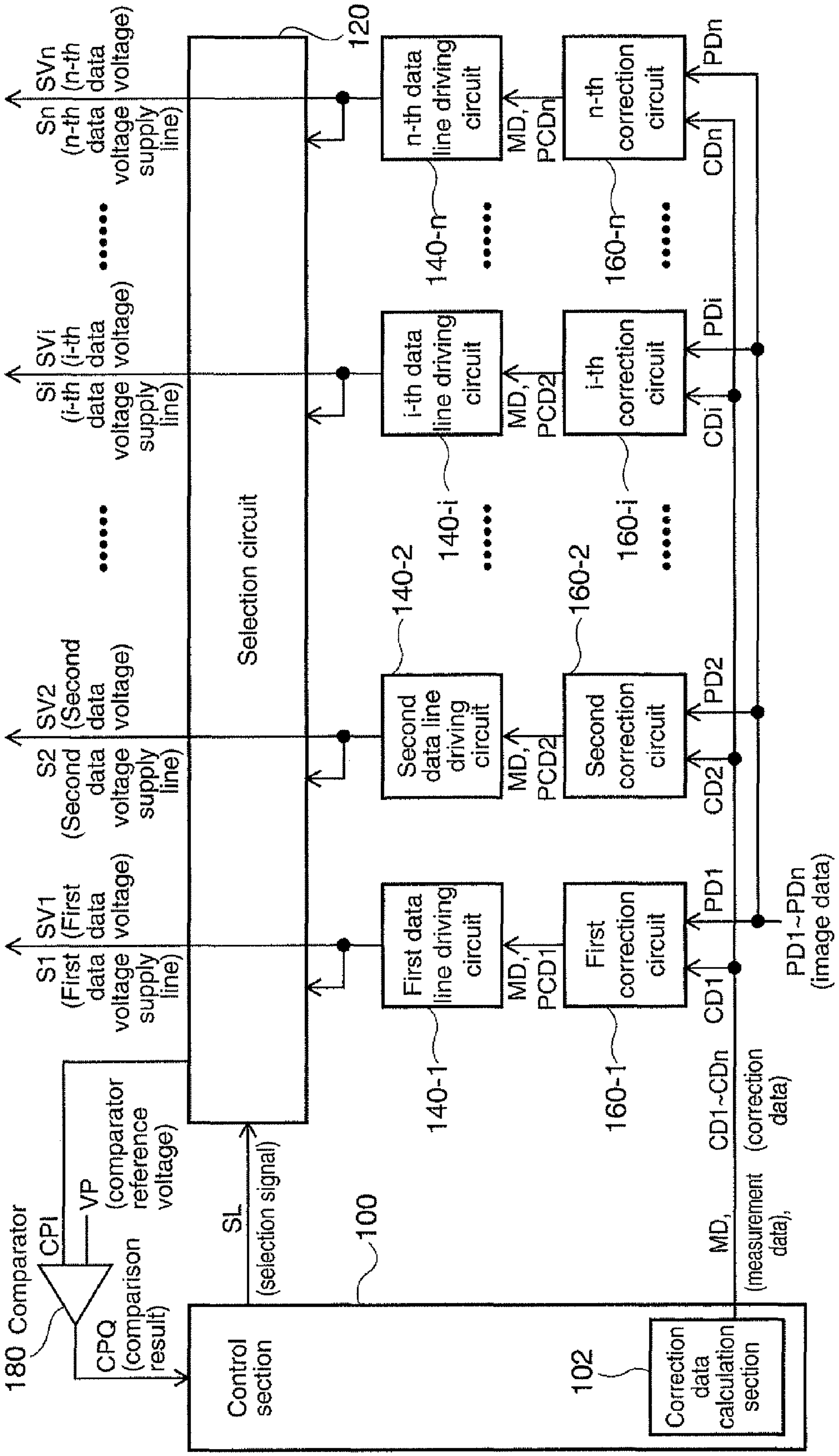
FIG. 2 shows a structure example of an embodiment of the invention.

FIG. 2 shows in greater detail an example of the structure of the embodiment. The exemplary structure shown in FIG. 2 includes the first through n-th data line driving circuits 140-1 through 140-*n*, the first through n-th correction circuits 160-1 through 160-*n*, a comparator 130, a control section 100, and a selection circuit 120. The control section 100 includes a correction data calculation section 102. It is noted that components of the present embodiment similar to those described with reference to FIG. 1, such as, the control section 100, shall be appended with the same reference numbers, and their description shall be omitted.

In accordance with the present embodiment, in a correction data calculation mode and a normal operation mode, differences in the first through n-th data voltages SV1 through SVn are corrected. More specifically, in the correction data calculation mode, the correction data calculation section 102 measures differences in the data voltages SV1 through SVn to obtain correction data CD1 through CDn. In the normal operation mode, the correction circuits 160-1 through 160-*n* use the correction data CD1 through CDn to correct image data PD1 through PDn, and the data line driving circuits 140-1 through 140-*n* receive correction-processed image data PCD1 through PCDn, and output corresponding data voltages SV1 through SVn, respectively.

For example, differences in the data voltages SV1 through SVn may be caused by offsets of operation amplifiers OP1 through OPn (to be described below with reference to FIG. 9) and differences in output characteristics of D/A converter circuits DAC1 through DACn. In this instance, even if identical grayscale data is inputted in the data line driving circuits 140-1 through 140-*n*, data voltages SV1 through SVn would not become to be uniform voltages due to the offsets and the like. In accordance with the present embodiment, correction data CD1 through CDn are used to cancel out these offsets and the like, thereby making data voltages SV1 through SVn corresponding to the same grayscale data uniform and therefore correcting differences in the data voltages SV1 through SVn.

Concretely, upon receiving comparison results CPQ from the comparator 180, the correction data calculation section 102 obtains correction data (hereafter referred to as correction data to be used for calculation target) for those of the data line driving circuits to be corrected. More concretely, in the correction data calculation mode, the correction data calculation section 102 sequentially varies measurement data MD within a predetermined range and outputs the same to the correction circuits 160-1 through 160-*n*. The data line driving circuits 140-1 through 140-*n* output data voltages corresponding to the measurement data MD as data voltages SV1 through SVn, respectively. Then, the comparator 180 compares the data voltages outputted from the data line driving circuits to be corrected (hereafter referred to as data voltages to be corrected) with a comparator reference voltage VP and outputs comparison results CPQ. Upon receiving the comparison results CPQ, the correction data calculation section 102 obtains correction data for calculation target.

For example, the correction data calculation section 102 outputs, as the measurement data MD, measurement grayscale data MGD1 through MGDk (k is a natural number), sequentially one data by one data, and the data line driving circuits to be corrected sequentially output data voltages corresponding to the measurement grayscale data MGD1 through MGDk. Then, the comparator 180 outputs comparison results CPQ respectively corresponding to the measurement grayscale data MGD1 through MGDk. The correction data calculation section 102 detects an edge (changing point) of the comparison results CPQ to be described below with reference to FIG. 3 and other figures, and obtains correction data to be used for calculation target, using the measurement grayscale data obtained at which the edge is detected.

The correction circuits 160-1 through 160-*n* receive measurement data MD, correction data CD1 through CDn and image data PD1 through PDn, and output the measurement data MD or correction-processed image data PCD1 through PCDn to the corresponding data line driving circuits 140-1 through 140-*n*. Concretely, in the correction data calculation mode, the correction circuits 160-1 through 160-*n* output the measurement data MD. In a normal operation mode, the correction circuits 160-1 through 160-*n* correct the image data PD1 through PDn with the correction data CD1 through CDn, respectively, and output the image data PCD1 through PCDn. For example, as described below with reference to FIG. 9 and other figures, the correction processing may be performed through inputting image data PD1 through PDn from the image data registers PDR1 through PDFn, and having adder circuits AD1 through ADn add the correction data CD1 through CDn to the image data PD1 through PDn, respectively.

Upon receiving the measurement data MD or the image data PCD1 through PCDn from the correction circuits 160-1 through **160-*n*, the data line driving circuits 140-1 through 140-*n* drive the first through n-th data voltage supply lines S1 through Sn (a plurality of data voltage supply lines). Concretely, in the correction data calculation mode, the data line driving circuits 140-1 through 140-*n* output data voltages SV1 through SVn corresponding to the measurement data MD. In the normal operation mode, the data line driving circuits 140-1 through 140-*n*** output data voltages SV1 through SVn corresponding to correction-processed image data PCD1 through PCDn, respectively.

The selection circuit 120 selects a data voltage to be corrected from among the data voltages SV1 through SVn, and outputs the same as an input voltage CPI for the comparator 180. For example, upon receiving a selection signal SL from the control section 100 as shown in FIG. 2, the selection circuit 120 selects the data voltage.

The comparator 180 receives the input voltage CPI (the data voltage to be corrected) and the comparator reference voltage VP and outputs a comparison result CPQ. Concretely, based on the magnitude (large/small) relation between the data voltage to be corrected and the comparator reference voltage VP, the comparator 180 outputs an H level (first logical level) or an L level (second logical level) as the comparison result CPQ. As described with reference to FIG. 3, when the correction data calculation section 102 varies the measurement data MD within a predetermined range, the comparator reference voltage VP is a voltage within a range of data voltages corresponding to the measurement data MD. For example, the comparator reference voltage VP may be supplied from a power supply circuit 50 shown in FIG. 4, or may be given by voltage-dividing a voltage supplied from the power supply circuit 50 by a resistance value.

An exemplary structure of the present embodiment has been described with reference to FIG. 2. However, many changes can be made by, for example, omitting a portion of the components, adding other components, changing connection relations, and the like. For example, as described with reference to FIG. 2, the correction data calculation section 102 may calculate correction data to be used for calculation target based on comparison results CPQ of the comparator 180. Alternatively, data voltages to be corrected may be converted into digital data by an A/D conversion circuit (Analog-to-Digital Converter), and the correction data calculation section 102 may calculate correction data to be used for calculation target based on the digital data.

1.3. Operations of Correction Data Calculation

Figure 3A:
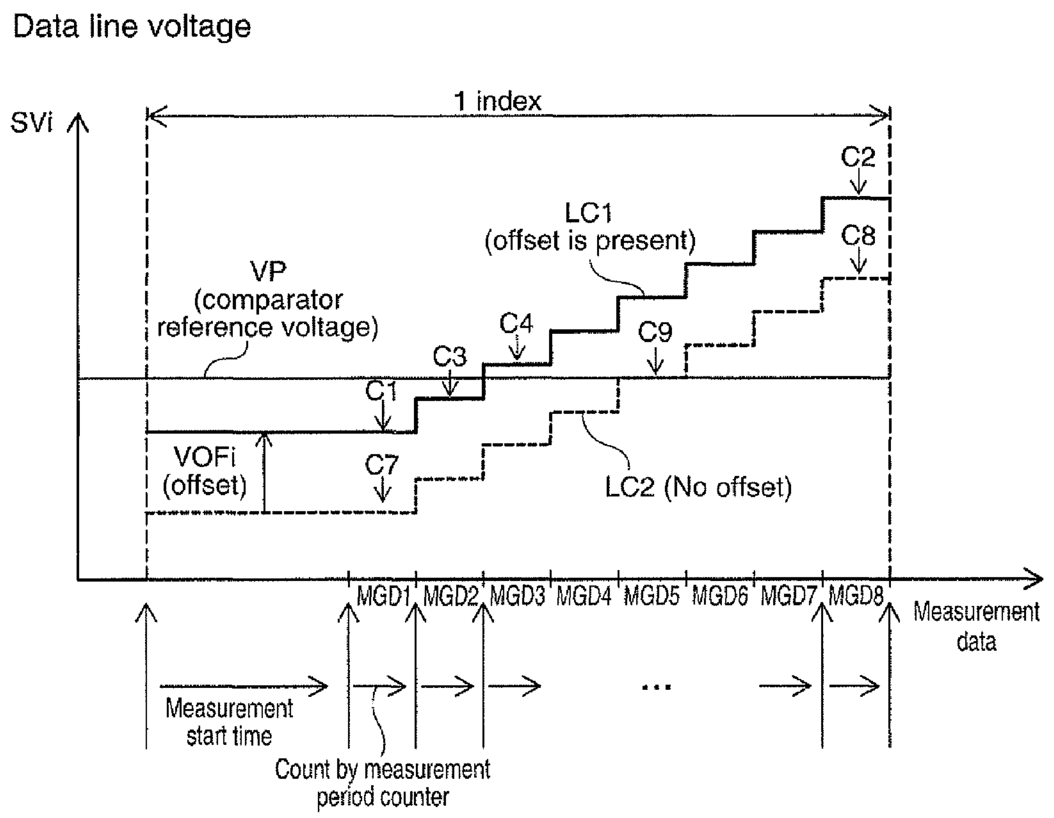
FIG. 3A shows an example of a voltage waveform of data voltages in a correction data calculation mode.
Figure 3B:
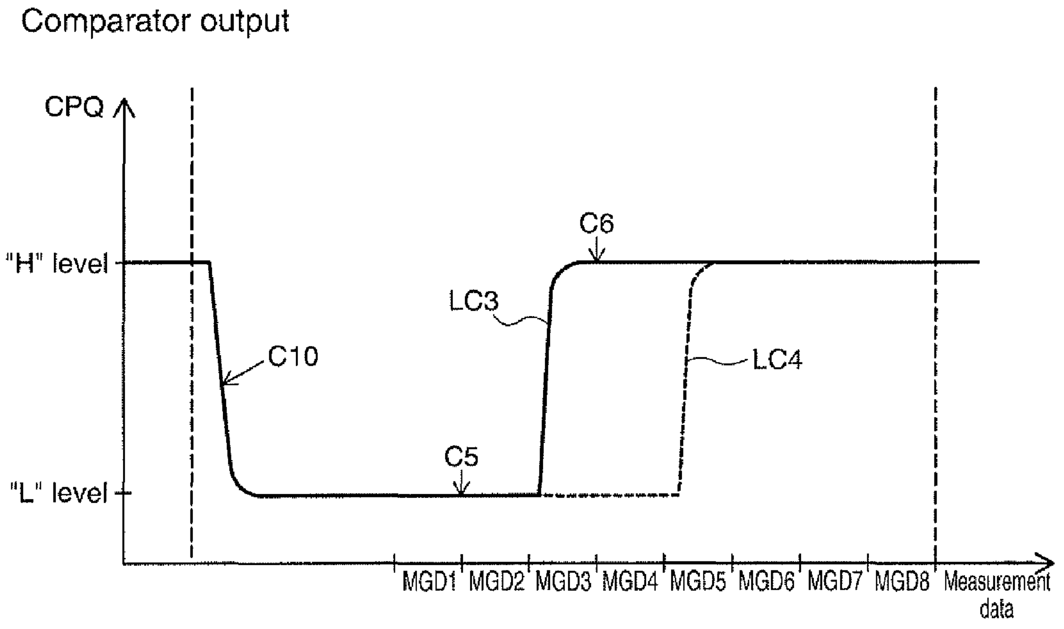
FIG. 3B shows an example of a voltage waveform of a comparison result in a correction data calculation mode.

Referring to FIGS. 3A and 3B, the operations of the present embodiment in the correction data calculation mode shall be described in detail. FIG. 3A schematically shows an example of waveforms of data voltages to be corrected in the correction data calculation mode. FIG. 3B schematically shows an example of waveforms of comparison results CPQ of the comparator 180 in the correction data calculation mode.

Referring to FIGS. 3A and 3B, an example shall be described with reference to a case in which the correction data calculation section 102 obtains correction data CDi ($1 \leqq i \leqq n$, where i is a natural number) as the correction data to be used for calculation target, and outputs eight measurement grayscale data MGD1 through MGD8 (k=8) as the measurement data MD. It is noted that this example may be similarly applicable to cases where correction data other than the correction data CDi are obtained. Also, the correction data calculation section 102 may obtain a plurality of correction data as the correction data to be used for calculation, and may output measurement grayscale data in a number other than eight as the measurement data MD.

In the correction data calculation mode, the correction data calculation section 102 outputs measurement grayscale data MGD1 through MGD8. The correction circuit **160-*i* outputs the measurement grayscale data MGD1 through MGD8 given from the correction data calculation section 102 to the data line driving circuit 140-*i*. Then, as indicated by LC1 in FIG. 3A, with the sequential variation of the measurement grayscale data MGD1-MGD8, the data line driving circuit 140-*i* sequentially outputs a data voltage indicated by C1 through a data voltage indicated by C2, as the data voltage SVi. The selection circuit 120 selects the data voltage SVi and outputs the same to the comparator 180 as a comparator input voltage CPI, and the comparator 180** outputs a comparison result CPQ.

For example, let us assume that the data voltage SVi corresponding to the measurement grayscale data MGD2 is smaller than the comparator reference voltage VP, as indicated by C3 in FIG. 3A, and the data voltage SVi corresponding to the measurement grayscale data MGD3 is greater than the comparator reference voltage VP, as indicated by C4. In this case, the comparison result CPQ indicated by LC3 in FIG. 3B assumes an L level as indicated by C5 corresponding to the measurement grayscale data MGD2, and an H level as indicated by C6 corresponding to the measurement grayscale data MGD3. Then the correction data calculation section 102 detects an edge that changes from the L level to the H level, and sets the measurement grayscale data MGD3, at which an edge is detected, as the correction data CDi.

According to the present embodiment, correction data for correcting differences in the data voltages can be obtained in a manner described above.

Let us now assume that no difference due to an offset or the like is present in the data voltage SVi. In this case, as indicated by LC2 shown in FIG. 3A, the data voltage SVi sequentially varies from a data voltage indicated by C7 to a data voltage indicated by C8. The data voltage SVi is an ideal data voltage corresponding to the measurement grayscale data MGD1 through MGD8. As described with reference to FIG. 2, the comparator 180 uses a voltage between the minimum value (C7) and the maximum value (C8) of the ideal data voltage as the comparator reference voltage VP. For example, a data voltage corresponding to the measurement grayscale data MGD5 indicated by C9 may be used. Then, if no difference were present due to an offset or the like, the comparison result CPQ would change as indicated by LC4 in FIG. 3B, and the correction data CDi corresponds to the measurement grayscale data MGD5.

As indicated by LC1 in FIG. 3A, the data voltage SVi that is actually outputted by the data line driving circuit **140-*i* in the correction data calculation mode contains a difference VOFi (offset) with respect to the ideal data voltage SVi indicated by LC2 in FIG. 3**A. According to the method for calculating correction data described above, the correction data CDi=MGD3 actually measured would be correction data having a grayscale level difference corresponding to the difference VOFi with respect to the correction data CDi=MGD5 for the ideal data voltage. Therefore, in accordance with the present embodiment, the difference VOFi in the data voltage SVi can be corrected by correcting the image data PDi using the correction data CDi=MGD3.

It is noted that, when differences are present in data voltages, luminance would differ from one data voltage supply line to another despite that the same grayscale is outputted, whereby the display quality would deteriorate. Therefore, there is an issue as to how data voltages can be accurately outputted by drivers for driving a liquid crystal panel.

In this respect, in accordance with the present embodiment, in the correction data calculation mode, the correction data calculation section 102 outputs measurement data MD, the data line driving circuits 140-1 through **140-*n* output data voltages SV1 through SVn corresponding to the measurement data MD, respectively, the comparator 180 compares the data voltage SV1 through SVn with a comparator reference voltage VP and outputs comparison results CPQ, and the correction data calculation section 102 calculates correction data CD1 through CDn using the comparison results CPQ. Then, in the normal operation mode, image data PD1 through PDn are corrected using the correction data CD1** through CDn, respectively.

By this, differences in the data voltages SV1 through SVn are corrected, and data voltages corresponding to image data PD1 through PDn can be highly accurately outputted. For this reason, pixels (sub-pixels, dots in a narrower sense) on different data voltage supply lines can be displayed with the same luminance for the same grayscale data, whereby the image quality can be improved. For example, drivers for a high-definition liquid crystal panel generally drive a great number of grayscales with a smaller grayscale voltage for each grayscale, such that the image quality would readily deteriorate due to differences in data voltages. Concretely, luminance unevenness such as vertical lines may appear in a display image. In accordance with the present embodiment, differences in data voltages SV1 through SVn can be corrected, such that deterioration of the image quality can be prevented even when a high-resolution liquid crystal panel is driven.

For example, among other methods for correcting differences in data voltages, there has been a method in which data voltage supply lines are directly driven by outputs of DACs that convert grayscale data to grayscale voltages, thereby preventing differences in data voltages derived from offsets of operation amplifiers. However, the DACs have higher output impedances compared to those of the operation amplifiers, which resulted in a problem of insufficient driving time in driving a high-definition liquid crystal panel and in multiplex-driving in which a plurality of data voltages are outputted in each horizontal scanning period.

In this respect, in accordance with the present embodiment, correction data CD1 through CDn are used to correct image data PD1 through PDn, thereby correcting differences in data voltages SV1 through SVn. Therefore, differences in the outputs of the data line driving circuits 140-1 through **140-*n* can be corrected with the data. Accordingly, the data voltage supply lines S1 through Sn can be driven at high speeds using operation amplifies OP1 through OPn, as described below with reference to FIG. 9**, for example.

Furthermore, for example, among other methods to correct differences in data voltages, there has been a method in which differences in data voltages are measured at the time of shipping and their correction data are stored, and the differences in the data voltages are corrected using the correction data. However, this method entails a problem in that changes in the characteristics after shipping cannot be coped with.

In this respect, in accordance with the present embodiment, the comparator 180 compares data voltages SV1 through SVn with a comparator reference voltage VP, and the correction data calculation section 102 calculates correction data CD1 through CDn upon receiving comparison results CPQ. By this, differences in the data voltages SV1 through SVn can be measured and corrected in real time. Therefore, even when the characteristics of the drivers change after shipping or change due to heat from back-lights or the like, deterioration of the image quality can be prevented.

Concretely, the present embodiment executes the 1H mode in which correction data is calculated in one horizontal scanning period in a non-display period in a vertical scanning period, thereby calculating correction data CD1 through CDn.

In this manner, by calculating correction data CD1 through CDn at each vertical scanning period, differences in data voltages SV1 through SVn can be corrected in real time while performing image displays. Accordingly, changes with time in the characteristics of the drivers after shipping can be accommodated. Also, by calculating correction data CD1 through CDn during non-display periods, differences in data voltages SV1 through SVn can be corrected without affecting image displays.

If initial values of correction data CD1 through CDn are not set, differences in data line voltages would not be corrected and therefore the image quality of displayed images would be deteriorated, until after the correction data CD1 through CDn are calculated by the 1H mode.

In this respect, in accordance with the present embodiment, the correction circuits 160-1 through **160-*n* may include correction data registers, and initial values of correction data CD1** through CDn may be set at the correction data registers before the 1H mode is executed.

By this, differences in data voltages SV1 through SVn can be corrected using the initial values even in a period before correction data CD1 through CDn are initially updated by the 1H mode. For this reason, image displays can be started in a state in which differences in data voltages SV1 through SVn are corrected, and therefore the image quality can be improved.

For example, in accordance with the present embodiment, initial values of correction data CD1 through CDn may be obtained in a batch by executing the burst mode in a display preparation period, and may be set at the correction data registers.

By this, the initial values can be set before calculation of correction data CD1 through CDn by the 1H mode. Also, by obtaining initial values during a display preparation period, initial values of correction data CD1 through CDn can be obtained without affecting the image display.

For example, in accordance with the present embodiment, the burst mode may be executed during a period in which image display is not performed at the time of starting up the system, as in a display preparation period. Concretely, the burst mode may be executed at the time of powering on electronic equipment (a projector, a car-navigation system, a PDA or the like) or at the time of restarting them from their standby state, before lighting up a back light or a projector lamp, and the like. By this, images can be displayed in a state in which differences in data voltages are corrected even immediately after starting up the system, and the image quality can be improved.

Alternatively, in accordance with the present embodiment, for example, the burst mode may be executed during a period in which image display is not performed at the time of switching a display mode, as in a display preparation period. For example, the burst mode may be executed at the time of switching the resolution of an image display screen. By this, images can be displayed in a state in which differences in data voltages are corrected even immediately after switching the display mode, and the image quality can be improved.

It is noted that, in accordance with the present embodiment, in a non-display period or in a display preparation period, the data voltage supply lines S1 through Sn may be set to a predetermined data voltage during the first horizontal scanning period among a plurality of horizontal scanning periods, and the correction data calculation section 102 may obtain correction data in the succeeding second horizontal scanning period.

For example, the data voltage supply lines S1 through Sn may be set to a predetermined data voltage during one horizontal scanning period (first horizontal scanning period) prior to another horizontal scanning period (second horizontal scanning period) in which the 1H mode is executed. Also, the data voltage supply lines S1 through Sn may be set to a predetermined data voltage during a horizontal scanning period (first horizontal scanning period) prior to a horizontal scanning period (second horizontal scanning period) in which correction data are initially obtained in a burst mode.

In this manner, in accordance with the present embodiment, the data voltage supply lines S1 through Sn, to which various data voltages are outputted as the data voltages for display images, are set to a uniform voltage in one horizontal scanning period before execution of correction data calculation. By this, every time when the correction data calculation is started, differences in data voltages can be measured, starting from the same data voltage. For this reason, differences in the data voltages can be measured with the same accuracy every time, such that correction data accurately reflecting the differences in the data voltages can be obtained.

It is noted that, as described below with reference to FIG. 8 and other figures, if the drivability of the data line driving circuits 140-1 through **140-*n* is insufficient, when the correction data calculation section 102** sequentially changes measurement data and outputs the same, data voltages corresponding to the measurement data may not be sufficiently driven. For this reason, differences in data voltages SV1 through SVn cannot be accurately measured.

In this respect, in accordance with the present embodiment, in the 1H mode or in the burst mode, correction data CD1 through CDn may be multiplied by an adjustment coefficient to obtain coefficient-multiplied correction data, and image data PD1 through PDn may be corrected in the normal operation mode based on the coefficient-multiplied correction data.

As a result, even when correction data CD1 through CDn are not accurately calculated due to insufficient drivability of the data line driving circuits 140-1 through **140-*n***, the correction data CD1 through CDn can be rectified by using the adjustment coefficient. Therefore, correction data accurately reflecting differences in data voltages SV1 through SVn can be obtained.

Furthermore, when the present embodiment is influenced by noise or the like, there is a problem in that there may be cases where differences in data voltages SV1 through SVn cannot be accurately corrected. For example, there may be cases where the comparator 180 cannot accurately compare data voltages with the comparator reference voltage VP, and therefore differences in data voltages SV1 through SVn cannot be accurately measured.

Then, when correction data are repeatedly calculated in the 1H mode or the like, and inaccurate correction data is suddenly calculated for a data line with which accurate correction data has been calculated, the luminance of pixels on the data line abruptly changes, which causes blinking of a vertical line to appear in a display image.

In this respect, in accordance with the present embodiment, the correction data calculation section 102 may use correction data currently obtained and correction data previously obtained for data line driving circuits to be corrected, to obtain correction data corresponding to the data line driving circuits to be corrected.

For example, when the currently obtained correction data is greater than the previously obtained correction data, a predetermined positive value may be added to the previously obtained correction data to obtain correction data. On the other hand, when the currently obtained correction data is smaller than the previously obtained correction data, a predetermined negative value may be added to the previously obtained correction data to obtain correction data.

In this manner, in accordance with the present embodiment, for correction data that are repeatedly calculated in the 1H mode, previously calculated correction data are used to perform a change amount limitation to limit the amount of change in correction data within a predetermined value range. By this, even when correction data CD1 through CDn, which do not accurately reflect differences in the data voltages SV1 through SVn due to noise or other influences, are calculated, abrupt changes in the correction data CD1 through CDn can be suppressed. Therefore, deterioration of the image quality due to inaccurate correction data CD1 through CDn can be prevented.

2. Multiplex Driving 2.1. Example Structure of Liquid Crystal Display Apparatus Performing Multiplex Driving Detailed operation and detailed structure of the present embodiment shall be described below with reference to an example in which the present embodiment performs multiplex driving where a plurality of data lines on an electro-optical panel are driven in each one horizontal scanning period. In the example to be described below, the present embodiment is applied to a mono-color liquid crystal panel that may be used for liquid crystal projectors (projection type display devices) and the like. It is noted that, as described below with reference to FIG. 14 and other figures, the present embodiment is also applicable to devices that do not perform multiplex driving. Furthermore, the present embodiment is also applicable to multiple-color, such as, RGB liquid crystal panels that may be used for PDA (Personal Digital Assistants), LCD televisions, cellular phones, car navigation systems and the like.

Figure 4:
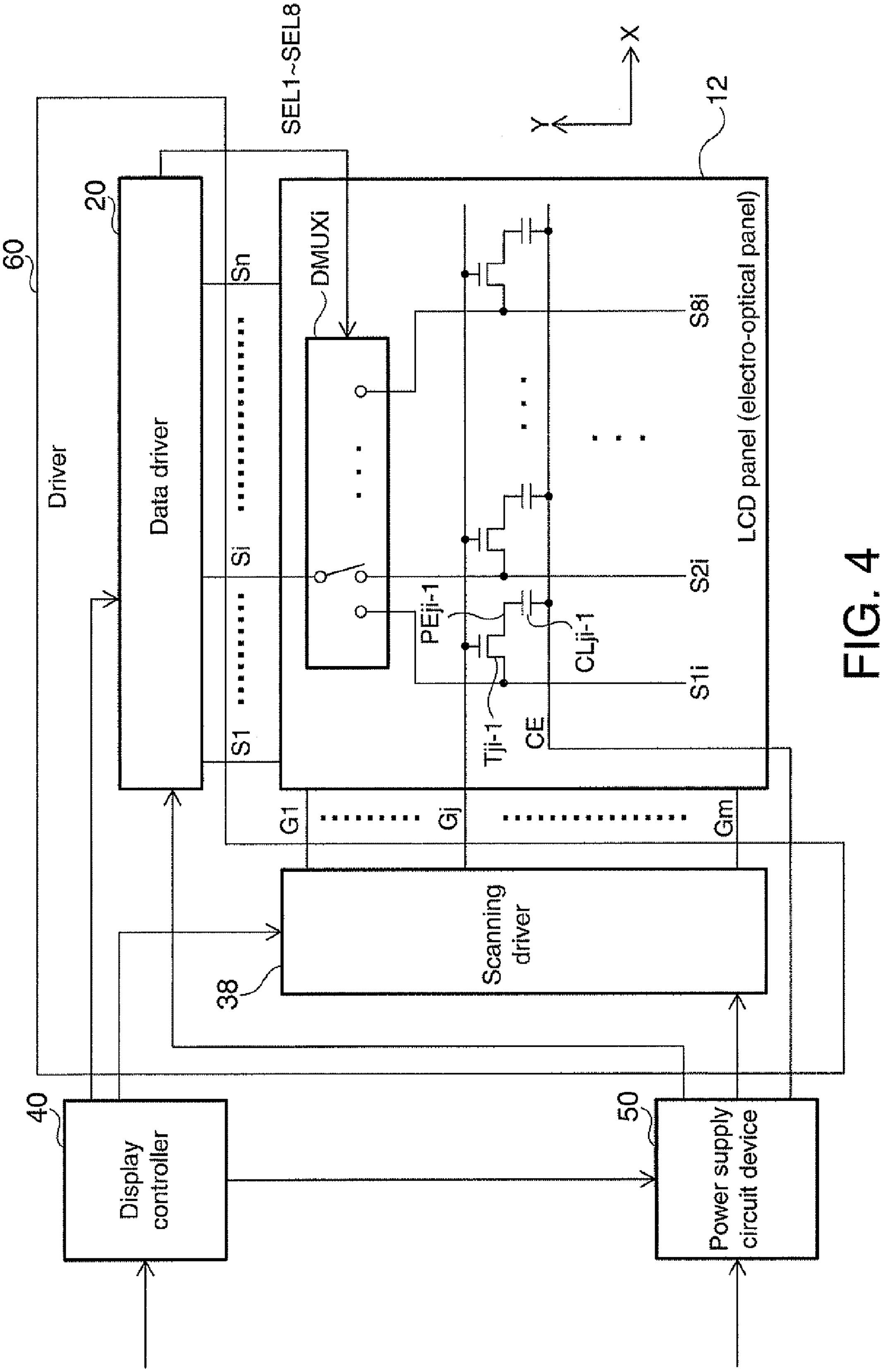
FIG. 4 shows a structure example of a liquid crystal display device.

FIG. 4 shows an example structure of a liquid crystal display device (an electro-optical device) including a driver 60 (an integrated circuit device) to which the present embodiment is applied. The example structure shown in FIG. 4 includes a liquid crystal panel 12 (an electro-optical panel), the driver 60, a display controller 40, and a power supply circuit 50.

As a concrete example, the liquid crystal panel 12 may be composed of, for example, an active matrix type liquid crystal panel. In this case, the liquid crystal panel 12 has a liquid crystal substrate (an active matrix substrate, for example, a glass substrate), on which a plurality of scanning lines G1 through Gm (m is an integer of 2 or greater) extending in X direction in FIG. 4 are arranged in Y direction, and a plurality of data lines S11 through S81, S12 through S82, . . . , S1*n* through S8*n* (n is an integer of 2 or greater) extending in Y direction are arranged in X direction. Also, the liquid crystal substrate is provided with data voltage supply lines S1 through Sn. Furthermore, the liquid crystal substrate is provided with demultiplexers DMUX1 through DMUXn corresponding to the data voltage supply lines, respectively.

Furthermore, the liquid crystal substrate is provided with, for example, a thin film transistor Tji-1 (similarly, thin film transistors Tji-2 through Tji-8) at a position corresponding to an intersection of a scanning line Gj ($1 \leqq j \leqq m$, where j is a natural number) and a data line S1*i* (similarly, data lines S2*i* through S8*i*) (1≦i≦n, where i is a natural number).

For example, the gate electrode of the transistor Tji-1 is connected to the scanning line Gj, the source electrode is connected to the data line S1*i*, and the drain electrode is connected to a pixel electrode PEji-1. A liquid crystal capacitor CLji-1 (a liquid crystal element, i.e., an electro optical element in a broader sense) is formed between the pixel electrode PEji-1 and a counter electrode CE (a common electrode). The transmittance of a pixel changes according to the voltage applied between the pixel electrode PEji-1 and the counter electrode CE.

The demultiplexer DMUXi divides a data voltage SVi supplied to the data voltage supply line Si by time-division and supplies the same to, for example, eight data lines S1*i* through S8*i*. The demultiplexer DMUXi divides the data voltage SVi on the data voltage supply line Si to each of the data lines based on a multiplex control signal provided from the data driver 20.

In FIG. 4, for simplification of the description, only the demultiplexer DMUXi and the data lines S1*i* through S8*i* corresponding to the data voltage supply line Si are shown. Also, only thin film transistors provided at positions corresponding to intersections between the data lines S1*i* through S8*i* and the scanning line Gj are illustrated. It is noted that demultiplexers and data lines corresponding to the other data voltage supply lines, and thin film transistors provided at positions corresponding to intersections between the other data lines and scanning lines are similarly provided.

It is noted that the voltage level of a counter electrode voltage VCOM to be given to the counter electrode CE is generated by a counter electrode voltage generation circuit included in the power supply circuit 50. For example the counter electrode CE may be formed over one surface of the counter substrate.

The data driver 20 drives the data voltage supply lines S1 through Sn of the liquid crystal panel 12 based on grayscale data. When the data driver 20 drives the data voltage supply lines S1 through Sn, the demultiplexers DMUX1 through DMUXn perform division-control as described above, and therefore the data driver 20 can drive the data lines S11 through S81, S12 through S82, . . . , S1*n* through S8*n*. On the other hand, the scanning driver 38 scans (sequentially drives) the scanning lines G1 through Gm of the liquid crystal panel 12.

The display controller 40 controls the data driver 20, the scanning driver 38 and the power supply circuit 50 according to contents set by a host such as an unshown central processing unit (CPU) or the like. More concretely, the display controller 40, for example, sets operation modes and supplies internally generated vertical synchronization signals and horizontal synchronization signals for the data driver 20 and the scanning driver 38.

The power supply circuit 50 generates, based on a reference voltage externally supplied, a variety of voltage levels (reference voltages) necessary for driving the liquid crystal panel 12, and the voltage level of the counter electrode voltage VCOM of the counter electrode CE.

The liquid crystal display device having such a structure drives the liquid crystal panel 12, by cooperative operations of the data driver 20, the scanning driver 38 and the power supply circuit 50, under the control of the display controller 40 based on externally supplied grayscale data.

It is noted that an example is described with reference to FIG. 4 in which each one dot is composed of one pixel in a mono-color display liquid crystal panel, and each one data voltage supply line supplies data voltages to eight data lines. In accordance with an aspect of the invention, each one pixel may be composed of three dots for displaying RGB color components, and each one data voltage supply line may supply data voltages (for example, data voltages corresponding to pixels of R1, R2, G1, G2, B1, B2) to six data lines.

Also, in FIG. 4, the liquid crystal display device is structured to include the display controller 40. However, the display controller 40 may be provided outside the liquid crystal display device. Alternatively, the display controller 40, together with the host, may be included in the liquid crystal display device. Also, a portion or the entirety of the data driver 20, the scanning driver 38, the display controller 40 and the power supply circuit 50 may be formed on the liquid crystal panel 12.

Furthermore, in FIG. 4, the data driver 20, the scanning driver 38 and the power supply circuit 50 may be integrated, thereby composing a display driver 60 as a semiconductor device (an integrated circuit, IC).

Figure 5:
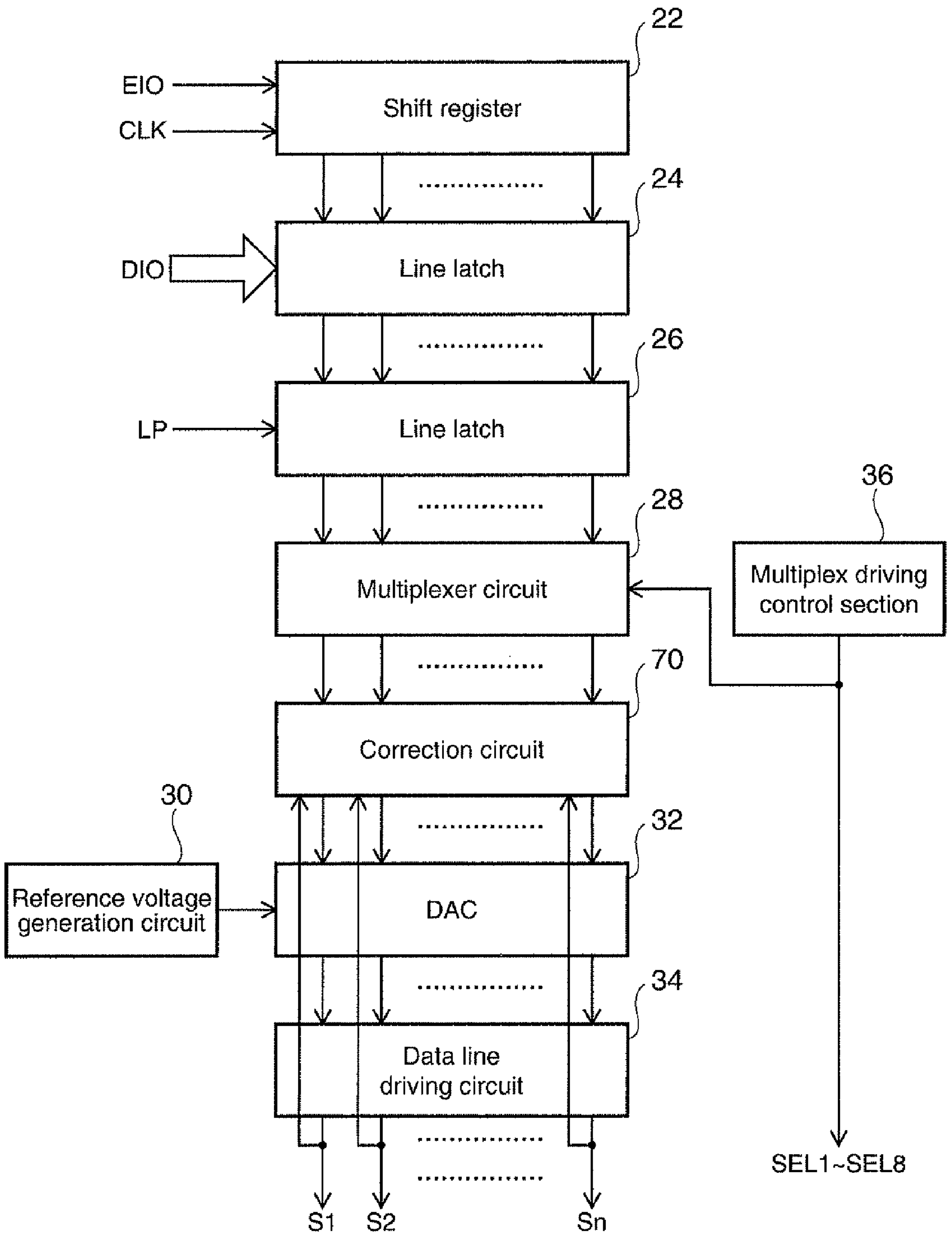
FIG. 5 shows a structure example of a data driver.

FIG. 5 shows an example of the structure of the data driver shown in FIG. 4. The data driver 20 includes a shift register 22, line latches 24 and 26, a multiplexer circuit 28, a correction circuit 70, a reference voltage generation circuit 30 (a grayscale voltage generation circuit), a DAC 32 (a digital-to-analog converter, a data voltage generation circuit in a broader sense), a data line driving circuit 34, and a multiplex drive control section 36.

The shift register 22 is provided for each of the data voltage supply lines, and includes a plurality of sequentially connected flip-flops. The shift register 22 retains an enable I/O signal EIO in synchronism with a clock signal CLK, and successively shifts the enable I/O signal EIO to an adjacent one of the flip-flops in synchronism with the clock signal CLK. The clock signal CLK and the enable I/O signal EIO may be inputted, for example, from the display controller 40.

Grayscale data (DIO) is inputted in the line latch 24 from the display controller 40 in the unit of 64 bits (8 bits (grayscale data)×8 (multiplication number)). The line latch 24 latches the grayscale data (DIO) in synchronism with the enable I/O signal EIO successively shifted by each of the flip-flops of the shift register 22.

The line latch 26 latches grayscale data in the unit of one horizontal scanning latched by the line latch 24 in synchronism with a horizontal synchronization signal LP supplied from the display controller 40.

The multiplexer circuit 28 performs time-division multiplexing of grayscale data for eight data lines latched corresponding to each of the source lines by the line latch 26. It is noted that the multiplexer circuit 28, when applied to the present embodiment, is provided, for example, between image registers PDR1 through PDRn and adder circuits AD1 through ADn shown in a detailed exemplary structure in FIG. 9.

The correction circuit 70 corrects differences in data voltages using correction data obtained by the correction data calculation method described above with reference to FIG. 2 and other figures. Concretely, correction data CD1 through CDn corresponding to the data voltage supply lines S1 through Sn are obtained in the correction data calculation mode, grayscale data given from the multiplexer circuit 28 are corrected by using the correction data CD1 through CDn in the normal operation mode, and the correction-processed grayscale data are outputted.

The multiplex drive control section 36 generates multiplex control signals SEL1 through SEL8 that determine time-division timings of data voltages on the data voltage supply lines. More concretely, the multiplex drive control section 36 generates multiplex control signals SEL1 through SEL8 in a manner that one of the multiplex control signals SEL1 through SEL8 sequentially becomes active in one horizontal scanning period. The multiplexer circuit 28 performs multiplexing based on the multiplex control signals SEL1 through SEL8 in a manner that the data voltages are supplied by time-division to the data voltage supply lines. It is noted that the multiplex control signals SEL1 through SEL8 are also supplied to demultiplexers DMUX1 through DMUXn of the liquid crystal panel 12.

The reference voltage generation circuit 30 generates 256 (=$2^8$) kinds of reference voltages (grayscale voltages). The 256 kinds of reference voltages (grayscale voltages) generated by the reference voltage generation circuit 30 are supplied to the DAC 32.

The DAC 32 generates analog grayscale voltages to be supplied to the respective data lines. Concretely, the DAC 32 selects one of the reference voltages (grayscale voltages) given from the reference voltage generation circuit 30 based on digital grayscale data given from the correction circuit 70 and outputs an analog grayscale voltage corresponding to the digital grayscale data, thereby outputting time-division multiplexed grayscale voltages.

The data line driving circuit 34 buffers the grayscale voltages given from the DAC 32 and outputs the same as data voltages to the data voltage supply lines S1 through Sn, thereby driving the data lines S11 through S81, S12 through S82, . . . , S1*n* through S8*n*. For example, the data line driving circuit 34 includes a voltage-follower-connected operational amplifier (an impedance converter circuit in a broader sense) provided for each of the data voltage supply lines. The operational amplifiers impedance-convert the grayscale voltages given from the DAC 32, and output the same to the data voltage supply lines S1 through Sn, respectively.

2.2. Operations of Multiplex Driving

Figure 6:
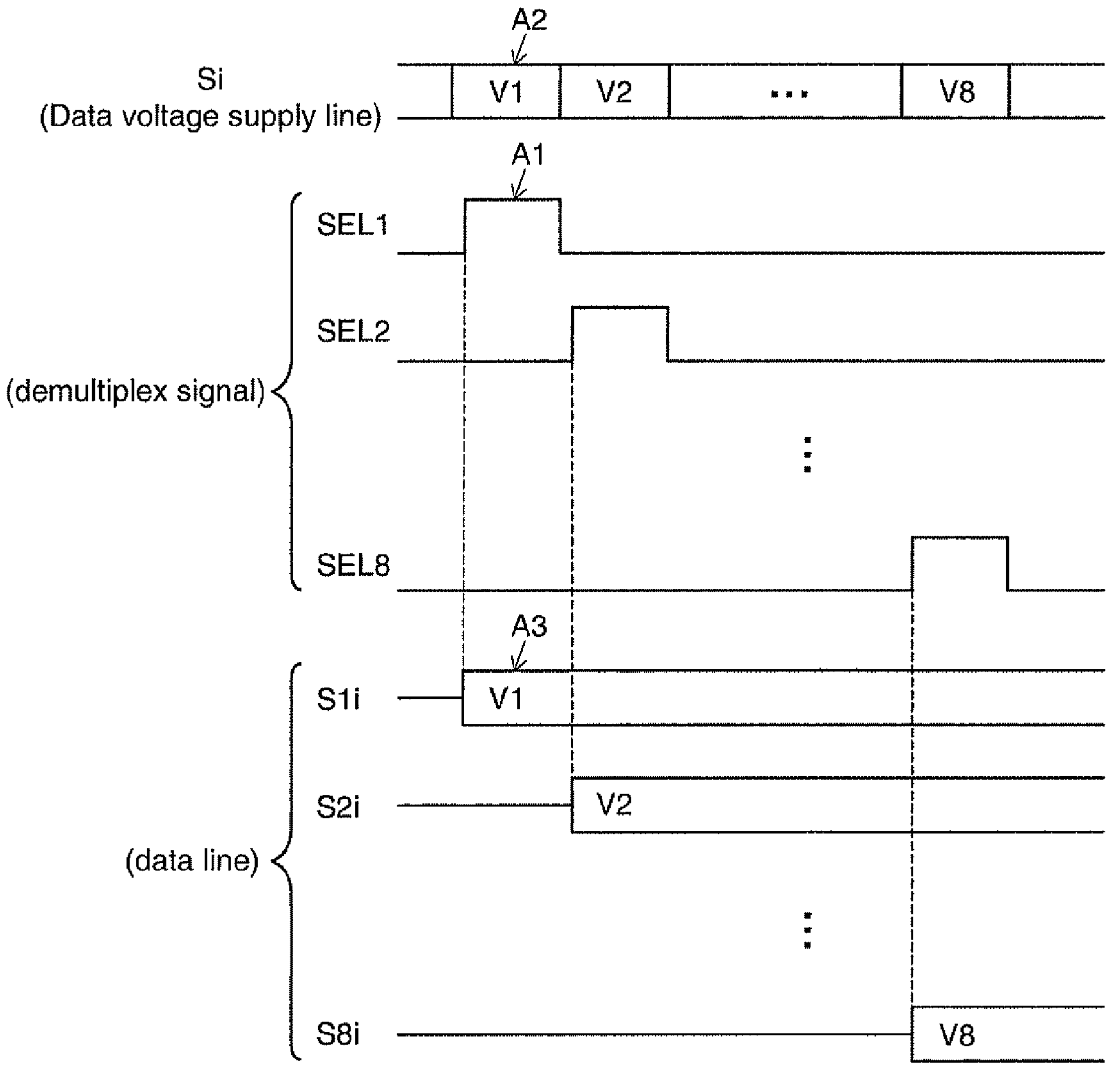
FIG. 6 shows an example of voltage waveforms on data lines in multiplex driving.

FIG. 6 shows a diagram for describing operations of the multiplex drive control section 36 shown in FIG. 5.

FIG. 6 shows an example of operations of a demultiplexer DMUXi that divides data voltages V1 through V8 (the data voltage SVi) supplied by time-division to the data voltage supply line Si into data lines S1*i* through S8*i*. It is noted that the other multiplexers are similarly operated.

As shown in FIG. 6, the data line driving circuit 34 drives the data lines S1*i* through S8*i* (a plurality of data lines) in one horizontal scanning period. More specifically, the data line driving circuit 34 outputs multiplexed data voltages V1 through V8 corresponding to the multiplexed data multiplexed by the multiplexer circuit 28. First, the multiplexed data multiplexed by the multiplexer circuit 28 and multiplexed grayscale voltages outputted by the DAC 32 are described.

The grayscale data to be latched by the line latch 26 for the data lines S1*i* through S8*i* (the first through eighth data lines) are referred to as GD1 through GD8. The multiplex control signals SEL1 through SEL8 generated by the multiplex drive control section 36 are signals, each of which becomes active, for example, once in one horizontal scanning period. Then, the multiplexer circuit 28 selects and outputs the grayscale data GD1 for the data line S1*i* (the first data line) when the multiplex control signal SEL1 becomes active, selects and outputs the grayscale data GD2 for the data line S2*i* (the second data line) when the multiplex control signal SEL2 becomes active, and selects and outputs the grayscale data GD8 for the data line S8*i* (the eighth data line) when the multiplex control signal SEL8 becomes active. As a result, the multiplexer circuit 28 generates multiplexed data in which the grayscale data GD1 through GD8 for the data lines S1*i* through S8*i* are time-division multiplexed, and supplies the multiplexed data to the correction circuit 70.

The correction circuit 70 performs correction processing of the multiplexed data in which the grayscale data GD1 through GD8 are time-division multiplexed, using correction data CDi. For example, the correction processing may be performed by adding the correction data CDi to each of the grayscale data GD1 through GD8. Then, correction-processed grayscale data GD1' through GD8' are outputted.

Each decoder of the DAC 32 selects grayscale voltages corresponding to the respective multiplexed and correction-processed grayscale data GD1' through GD8' from among the reference voltages (grayscale voltages of, for example, 256 grayscales). As a result, each decoder of the DAC 32 outputs multiplexed grayscale voltages. In other words, the DAC 32 generates grayscale voltages respectively corresponding to the grayscale data multiplexed by the multiplexer circuit 28.

Then, as shown in FIG. 6, upon receiving the multiplexed grayscale voltages from the DAC, the data line driving circuit 34 outputs, in one horizontal scanning period, the multiplexed data voltages V1 through V8 (the first through eighth data voltages) as data voltage SVi.

The demultiplexer DMUXi divides the multiplexed data voltages V1 through V8 on the data voltage supply line Si, using the multiplex control signals SEL1 through SEL8, and output the data voltages to the data lines S1*i* through S8*i*.

More concretely, when the multiplex control signal SEL1 is active as indicated by A1 in FIG. 6, the demultiplexer DMUXi outputs the multiplexed data voltage V1 indicated by A2 onto the data line S1*i* as indicated by A3. Similarly, when the multiplex control signal SEL2 is active, the demultiplexer DMUXi outputs the multiplexed data voltage V2 onto the data line S2*i*, and when the multiplex control signal SEL8 is active, the demultiplexer DMUXi outputs the multiplexed data voltage V8 onto the data line S8*i*.

In this manner, data voltages can be supplied to the sources of the TETs connected to those of the scanning lines selected on the liquid crystal panel 12.

2.3. Correction Data Calculation in Multiplex Driving

Figure 7:
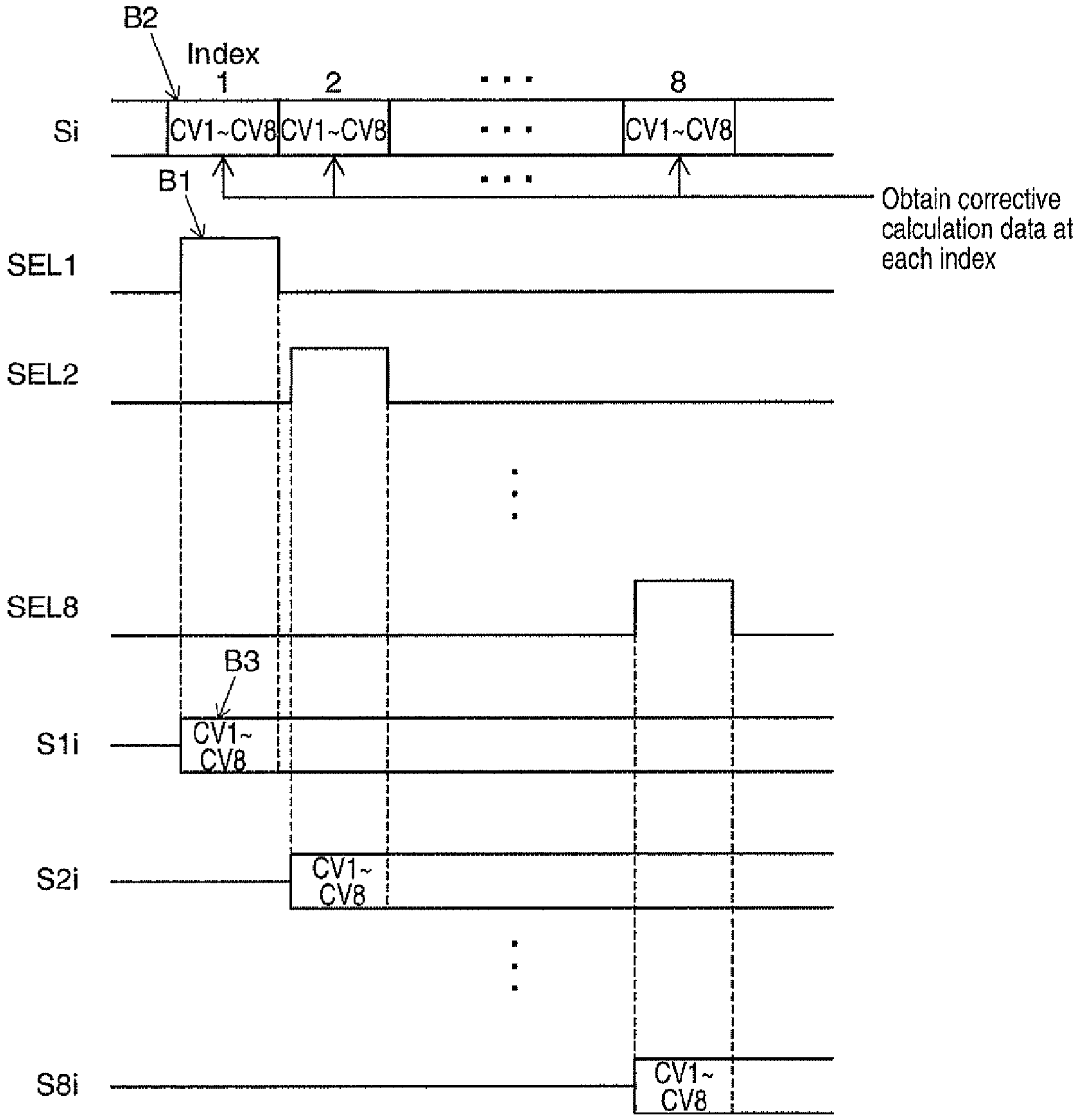
FIG. 7 shows an example of voltage waveforms on data lines in a correction data calculation mode.

FIG. 7 shows an example of operations of correction data calculation in multiplex driving. FIG. 7 shows a diagram for describing a case where, in the correction data calculation mode, for example, correction data CDi for the data voltage supply line Si is obtained as correction data to be used for calculation target (correction data for a data line driving circuit to be corrected). It is noted that the other correction data may be similarly obtained.

As shown in FIG. 7, in accordance with the present embodiment, when multiplex driving is performed in the normal operation mode, a plurality of corrective calculation data can be obtained in one horizontal scanning period in the correction data calculation mode. Concretely, corrective calculation data can be calculated by a method similar to the calculation method described with reference to FIG. 3 and other figures. Then, correction data to be used for calculation target can be obtained using the plurality of corrective calculation data.

For example, in the case of multiplex driving in which p number (p is an integer of 2 or greater) of data lines are driven, as the plurality of data lines, by one data voltage supply line, the correction data calculation section 102 may obtain p number of corrective calculation data as the plurality of corrective calculation data.

As indicated in FIG. 7, in the case of multiplex driving in which the data voltage supply line Si supplies data voltages to eight data lines in one horizontal scanning period, the correction circuit 70 measures corrective calculation data eight times in one horizontal scanning period in the correction data calculation mode. In other words, when the first through eighth rounds for measuring corrective calculation data are defined as the first through eighth indexes, the measurement of corrective calculation data described with reference to FIG. 3 and other figures is performed for each of the indexes, thereby obtaining the first through eighth corrective calculation data.

Concretely, when the multiplex control signal SEL1 is active as indicated by B1 in FIG. 7, the correction circuit 70 performs measurement in the first index. In the first index, the correction circuit 70 outputs, for example, measurement grayscale data MGD1 through MGD8 (the measurement data MD). The DAC 32 selects and outputs grayscale voltages corresponding to the respective measurement grayscale data MGD1 through MGD8 from among the reference voltages (grayscale voltages). Then, as indicated by B2 in FIG. 6, the data line driving circuit 34 outputs, to the data voltage supply line Si, data voltages CV1 through CV8 corresponding to the measurement grayscale data MGD1 through MGD8 in response to the grayscale voltages of the DAC 32. In this instance, as indicated by B3, the demultiplexer DMUXi outputs the data voltage CV1 through CV8 based on a multiplex control signal SEL 1 to the data line S1*i*. The correction circuit 70 compares the data voltages CV1 through CV8 outputted to the data voltage supply line Si with the comparator reference voltage VP by, for example, the comparator 130 shown in FIG. 2 to obtain a comparison result CPQ, and obtains first corrective calculation data, using measurement grayscale data obtained at which the comparison result CPQ is inverted (for example, from L level to H level).

Then, the correction circuit 70 similarly obtains the second through eighth corrective calculation data at the second through eighth indexes, and performs, for example, a process of averaging the first through eighth corrective calculation data to obtain correction data CDi.

In this manner, in accordance with the present embodiment, differences in outputs of the data line driving circuits are repeatedly measured in one horizontal scanning period. By this, influences of measurement errors by noise and the like can be reduced. Also, in accordance with the present embodiment, corrective calculation data may be obtained by driving the data lines by time-division in a similar manner as the multiplex driving in one horizontal scanning period, as described with reference to FIG. 7. By this, the data lines can be driven with the same accuracy in the normal operation mode and the correction data calculation mode, such that data voltages can be accurately corrected.

Here, in accordance with the present embodiment, when the correction data calculation section 102 sequentially varies the measurement data MD within a predetermined range, and the comparison results CPQ are fixed to either the L level (first level) or the H level (second level), it may be judged that an overflow occurs. In this case, data for overflow may be used as corrective calculation data.

For example, the correction data calculation section 102 may use a predetermined constant as the data for overflow. Also, for example, when it is judged that an overflow occurs in obtaining the s-th corrective calculation data among the first through t-th corrective calculation data ($1 \leqq s \leqq t$, where s and t are integers of 2 or greater), the correction data calculation section 102 may perform an averaging process to calculate an average of the first through the (s−1)-th corrective calculation data among the first through t-th corrective calculation data thereby obtaining data for overflow, and use the same as the s-th corrective calculation data.

In this manner, in accordance with the present embodiment, when it is judged that differences in data voltages exceed the measurement range, correction data is obtained by using the data for overflow. Accordingly, even when an overflow occurs in calculation of corrective calculation data due to influences of noise or the like, correction data that reflect differences in data voltages as accurately as possible can be obtained.

2.4. Adjustment Coefficient

Figure 8:
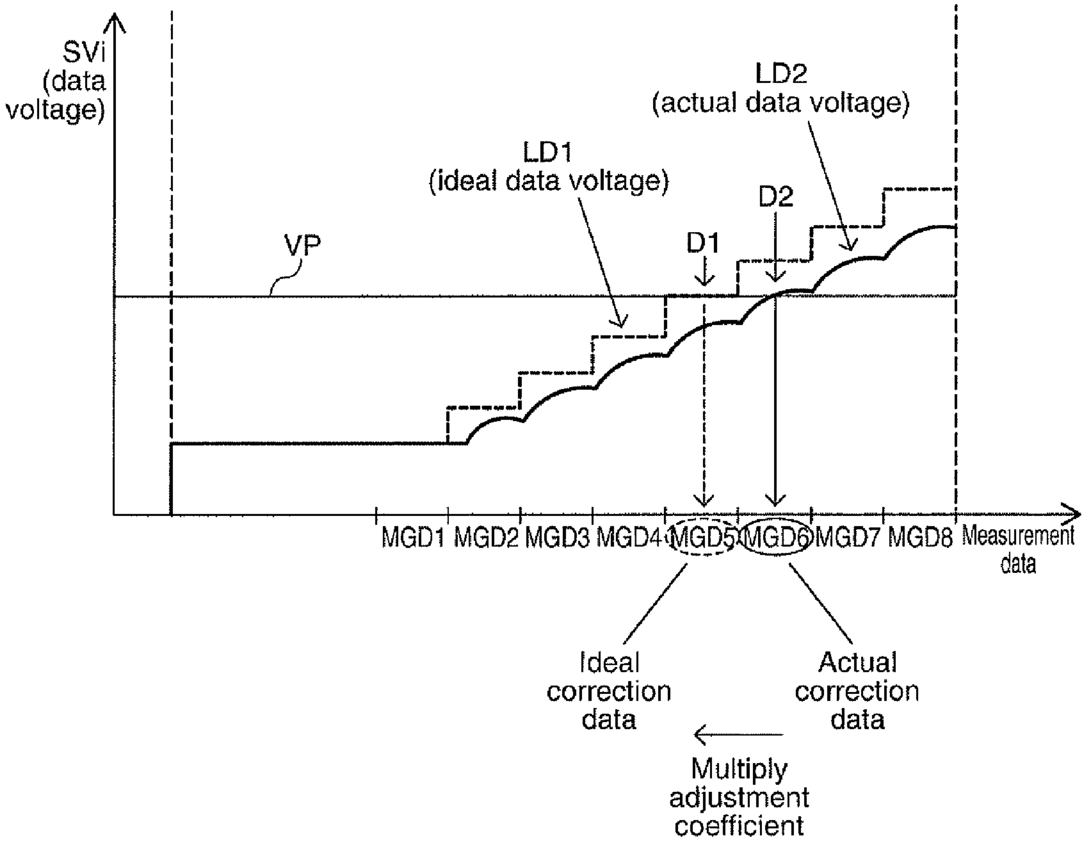
FIG. 8 is a graph for describing adjustment coefficients.

FIG. 8 shows a graph for describing an adjustment coefficient by which correction data is to be multiplied. FIG. 8 shows the data voltage SVi in one of the first through eighth indexes described with reference to FIG. 7.

In this case, the data line driving circuit 34 outputs the data voltage SVi to the data voltage supply line Si to drive one of the data lines S1*i* through S8*i*. For example, one of the data lines S1*i* through S8*i* is driven by an operational amplifier OPi to be described below with reference to FIG. 9.

As indicated by LD1 in FIG. 8, when the operational amplifier OPi has a sufficient capability (speed) to drive the data line, as the correction circuit 70 outputs measurement grayscale data MGD1 through MGD8, the data line is sufficiently driven to reach desired data voltages. As indicated by D1, for example, when the data voltage corresponding to the measurement grayscale data MGD5 is greater than the comparator reference voltage VP, the correction circuit 70 uses the measurement grayscale data MGD5 as grayscale data for correction. It is assumed for the sake of simplification that the measurement grayscale data MGD5 is also measured as grayscale data for correction in the other indexes, and the measurement grayscale data MGD5 is obtained as the correction data CDi.

On the other hand, in multiplex driving, a plurality of corrective calculation data are measured in one horizontal scanning period, and data lines need to be driven with data voltages corresponding to the plurality of measurement grayscale data in one measurement, and therefore it is possible that the operational amplifier OEi may not have a sufficient capability (speed) to drive the data lines. In such a case, as indicated by LD2, the data lines may not be sufficiently driven and may not reach the desired data voltage level, in contrast to the data line voltage indicated by LD1. As indicated by D2, for example, when the data voltage corresponding to the measurement grayscale data MGD6 is greater than the comparator reference voltage VP, the measurement grayscale data MGD5 is used as grayscale data for correction. Similarly, it is assumed that the measurement grayscale data MGD6 is measured as grayscale data for correction in the other indexes, and the measurement grayscale data MGD6 is obtained as correction data CDi.

In this manner, when the drivability of the operational amplifier is insufficient, correction data is calculated with a value shifted from that of the correction data to be calculated when the drivability of the operational amplifier is ideal. For this reason, actually calculated correction data may be multiplied by an adjustment coefficient, thereby correcting the difference from the correction data to be calculated when the drivability of the operational amplifier is ideal.

3. Detailed Structure Example 3.1. Detailed Structure Example of Embodiment

FIG. 9 shows an example of the structure in detail of the present embodiment. It is noted that components that are similar to those described with reference to FIG. 2 and other figures, such as, the comparator and the like, may be appended with the same signs, and their description shall be omitted. Also, the present embodiment is not limited to the structure shown in FIG. 9, and a variety of modifications can be made, such as, omission of a portion of the structure (for example, shift registers, data switching circuits and the like), addition of other components, and the like.

The structure example shown in FIG. 9 includes switches SW1 through SWn, shift registers SR1 through SRn, operational amplifiers OP1 through OPn, D/A converter circuits DAC1 through DACn (Digital to Analog Converters, or data voltage generation circuits in a broader sense), selectors DS1 through DSn (data switching circuits), adder circuits AD1 through ADn (correction processing circuits in a broader sense), correction data registers CDR1 through CDRn, image data registers PDR1 through PDRn, a comparator 180, a control section 100, and a correction data calculation section 102.

The image data registers PDR1 through PDRn retain image data PD1 through PDn that are grayscale data corresponding to pixels to be driven by the data voltage supply lines S1 through Sn. For example, the image data PD1 through PDn may be written from image data stored in a storage section of a RAM (Random Access Memory) or the like in a batch to the image data registers PDR1 through PDRn, or their streamed data may be received through an I/F circuit and sequentially written in the image data registers PDR1 through PDRn.

The correction data registers CDR1 through CDRn retain measurement data MD and correction data CD1 through CDn given from the correction data calculation section 102. For example, when correction data CDi is calculated in the correction data calculation mode, measurement data MD sequentially outputted from the correction data calculation section 102 is set at the correction data register CDRi, and the correction data register CDRi outputs the correction data MD to the selector DSi. Then, the correction data calculation section 102 performs correction data calculation to obtain correction data CDi, and sets the same at the correction data register CDRi. In the normal operation mode, the correction data register CDRi outputs the correction data CDi to the adder circuit ADi. At the correction data registers CDR1 through CDRn, for example, measurement data and correction data are set when the outputs of the corresponding shift registers SR1 through SRn are active.

It is noted that initial values may be set at the correction data registers CDR1 through CDRn. For example, as described below with reference to FIG. 11, initial values of the correction data CD1 through CDn may be set in a burst mode, or initial values of the correction data CD1 through CDn may be set from an unshown host controller.

The adder circuits AD1 through ADn perform correction processing by adding correction data CD1 through CDn to the image data PD1 through PDn, respectively, and output corrected image data PCD1 through PCDn after the correction processing. It is noted that the correction processing may be performed not only by adding correction data CD1 through CDn to the image data PD1 through PDn, but also by performing addition or multiplication with another coefficient.

Upon receiving measurement data MD from the correction data registers CDR1 through CDRn and image data PCD1 through PCDn from the adder circuits AD1 through ADn, the selectors DS1 through DSn select either of them, and output the same to the D/A converter circuits DAC1 through DACn. Concretely, the selectors DS1 through DSn select data based on a correction enable signal C_Enable given from the control circuit 100. For example, in the correction data calculation mode, the control section 100 makes the correction enable signal C_Enable to be active, and the selectors DS1 through DSn select and output the measurement data MD. On the other hand, in the normal operation mode, the control section 100 makes the correction enable signal C_Enable to be non-active, and the selectors DS1 through DSn select and output the image data PCD1 through PCDn.

The D/A converter circuits DAC1 through DACn generate grayscale voltages to be supplied to the data voltage supply lines S1 through Sn. Concretely, based on grayscale data (measurement data MD or image data PCD1 through PCDn) given from the selector DS1 through DSn, the D/A converter circuits select relevant ones of the reference voltages and output grayscale voltages. More concretely, in the correction data calculation mode, grayscale voltages corresponding to measurement data MD are outputted, and in the normal operation mode, grayscale voltages corresponding to image data PCD1 through PCDn are outputted. When multiplex driving is performed by the present embodiment, the D/A converter circuits DAC1 through DACn output grayscale data time-division multiplexed based on image data PCD1 through PCDn whose grayscale data are time-division multiplexed. It is noted that the reference voltages are inputted from, for example, the reference voltage generation circuit 30 shown in FIG. 5.

The operational amplifiers OP1 through OPn buffer grayscale voltages from the D/A converter circuits DAC1 through DACn, and output data voltages S1 through Sn to the data voltage supply lines S1 through Sn. For example, as shown in FIG. 9, the operational amplifiers OP1 through OPn may be used to compose voltage followers whereby grayscale voltages can be buffered.

The shift registers SR1 through SRn output switching control signals SRQ1 through SRQn that control switching ON and OFF of the switches SW1 through SWn. Concretely, the shift registers SR1 through SRn acquire SR_Data at H level (first logical level) from the control section 100, and sequentially shift SR_Data at H level based on SR_Clock given from the control section 100, thereby outputting switch control signals that sequentially become active. For example, when correction data CDi is calculated in the correction data calculation mode, the shift register SRi outputs a switching control signal SRQi that is active.

The switches SW1 through SWn turn ON and OFF based on signals from the shift registers SR1 through SRn. Concretely, the switches SW1 through SWn turn ON when the signals from the shift registers SR1 through SRn are active, and turn OFF when they are non-active. For example, when correction data CDi is to be obtained in the correction data calculation mode, the switch SWi turns ON, and the data voltage SVi outputted from the operational amplifier OPi is inputted as a comparator input voltage CPI in the comparator 180.

The control section 100 outputs shift data SR_Data, a reset signal SR_Reset for the shift registers SR1 through SRn, a clock SR_Clock for the shift registers SR1 through SRn to acquire the shift data, an enable signal SR_Enable to determine the period for the shift registers SR1 through SRn to output an active signal, and a correction enable signal C_Enable for the selectors DS1 through DSn to output measurement data MD in the correction data calculation mode.

3.2. 1H Mode

Figure 10:
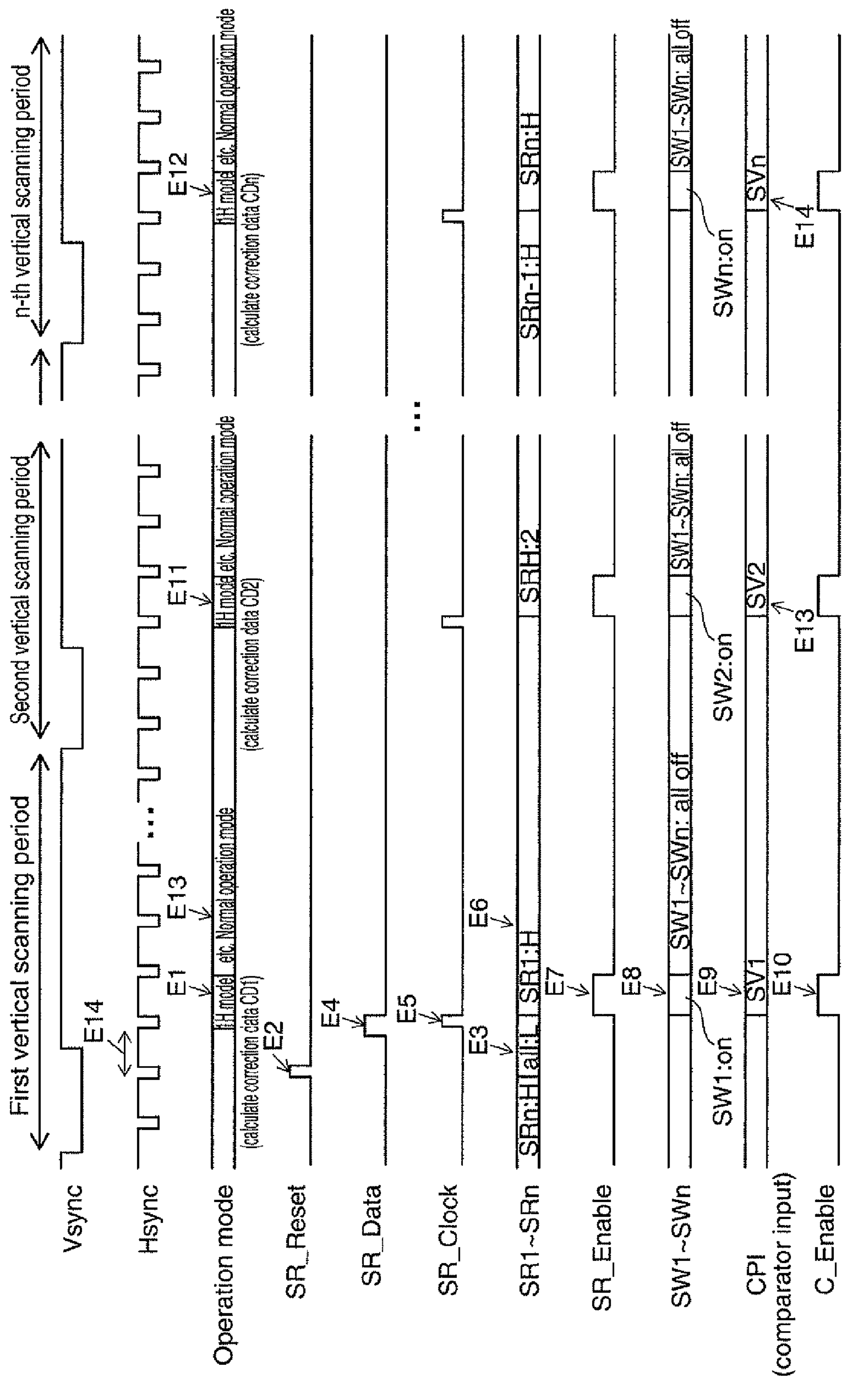
FIG. 10 shows an example of signal waveforms in a 1H mode.

FIG. 10 shows an example of signal waveforms in the 1H mode (first mode).

In accordance with the present embodiment, correction data is calculated in the 1H mode in a horizontal scanning period in a non-display period. Concretely, the correction data calculation by the 1H mode is performed in each vertical scanning period among the first through n-th vertical scanning periods in a plurality of vertical scanning periods (frames) in non-display periods.

It is noted that the non-display period in which the present embodiment executes the 1H mode is a period in which the data line driving circuits 140-1 through **140-*n* do not output data voltages SV1 through SVn corresponding to image data PD1 through PDn. For example, the non-display period is a period starting from the falling of a vertical synchronization signal Vsync until an input of image data PD1 through PDn in the image data registers PDR1 through PDRn is started. Alternatively, it may be a period starting from the falling of a vertical synchronization signal Vsync until the first scanning line (for example, the scanning line G1 in FIG. 4) of a liquid crystal panel (for example, the liquid crystal panel 12 shown in FIG. 4**) is selected.

As indicated by E1 in FIG. 10, the correction data calculation section 102 calculates correction data CD1 in one horizontal scanning period within the first vertical scanning period.

In this instance, as indicated by E2, the control section 100 makes SR_Reset to be active, thereby resetting the shift registers SR1 through SRn, and setting the outputs of the shift registers SR1 through SRn to be non-active as indicated by E3.

Next, as indicated by E4, the control section 100 outputs SR_Data at H level (first logical level), and the shift register SR1 acquires SR_Data at H level as indicated by E6, by SR_Clock indicated by E5 given from the control section 100.

As indicated by E7, the control section 100 makes SR_Enable to be active, and the shift register SR1 outputs an active switching control signal SRQ1 while SR_Enable is active.

Then, as indicated by E8, the switch SW1 turns ON upon receiving the active switching control signal SRQ1, and a data voltage SV1 is inputted as a comparator input CPI in the comparator 180, as indicated by E9.

The correction data calculation section 102 sequentially outputs measurement data MD in the 1H mode indicated by E1. As indicated by E10, when the control section 100 makes C_Enable to be active, the data voltage SV1 corresponding to the measurement data MD is outputted to the data voltage supply line S1, and inputted in the comparator 180. Upon receiving the comparison result CPQ from the comparator 180, the correction data calculation section 102 performs an edge detection with, for example, an edge detection section 260 shown in FIG. 12, thereby obtaining correction data CD1. The correction data calculation section 102 sets the obtained correction data CD1 at the correction data register CDR1.

In this manner, the correction data calculation section 102 obtains the correction data CD1 in the 1H mode in the first vertical scanning period indicated by E1. Similarly, as indicated by E11, in the 1H mode in the succeeding second vertical scanning period, correction data CD2 is obtained and set at the correction data register CDR2, and as indicated by E12, in the 1H mode in the n-th vertical scanning period, correction data CDn is obtained and set at the correction data register CDRn. Then, in the following (n+1)-th vertical scanning period, correction data CD1 is obtained again, and set at the correction data register CDR1. The foregoing processing is repeated, whereby correction data CD1 through CDn retained at the correction data registers CDR1 through CDRn are sequentially updated.

As indicated by E13, in accordance with the present embodiment, during the period between one 1H mode and another 1H mode, image display in the normal operation mode is performed. Concretely, in accordance with the present embodiment, image data is corrected by the correction data obtained in the 1H mode, and image display is performed.

In this manner, by performing correction data calculation in the 1H mode during each vertical scanning period, differences in data voltages SV1 through SVn due to offsets and the like of the operational amplifiers OP1 through OPn can be corrected in real-time.

Also, in accordance with the present embodiment, the correction data calculation section 102 can control the amount of change in correction data. For example, when the correction data calculation section 102 obtains correction data CDi (current correction data) in the 1H mode in a certain vertical scanning period, the amount of change from correction data CDi (previous correction data) obtained in the 1H mode in an n-th preceding vertical scanning period can be restricted within a predetermined positive or negative value. By this, the image quality can be prevented from deteriorating as a result of an abrupt change in correction data due to noise or the like.

3.3. Burst Mode

Figure 11:
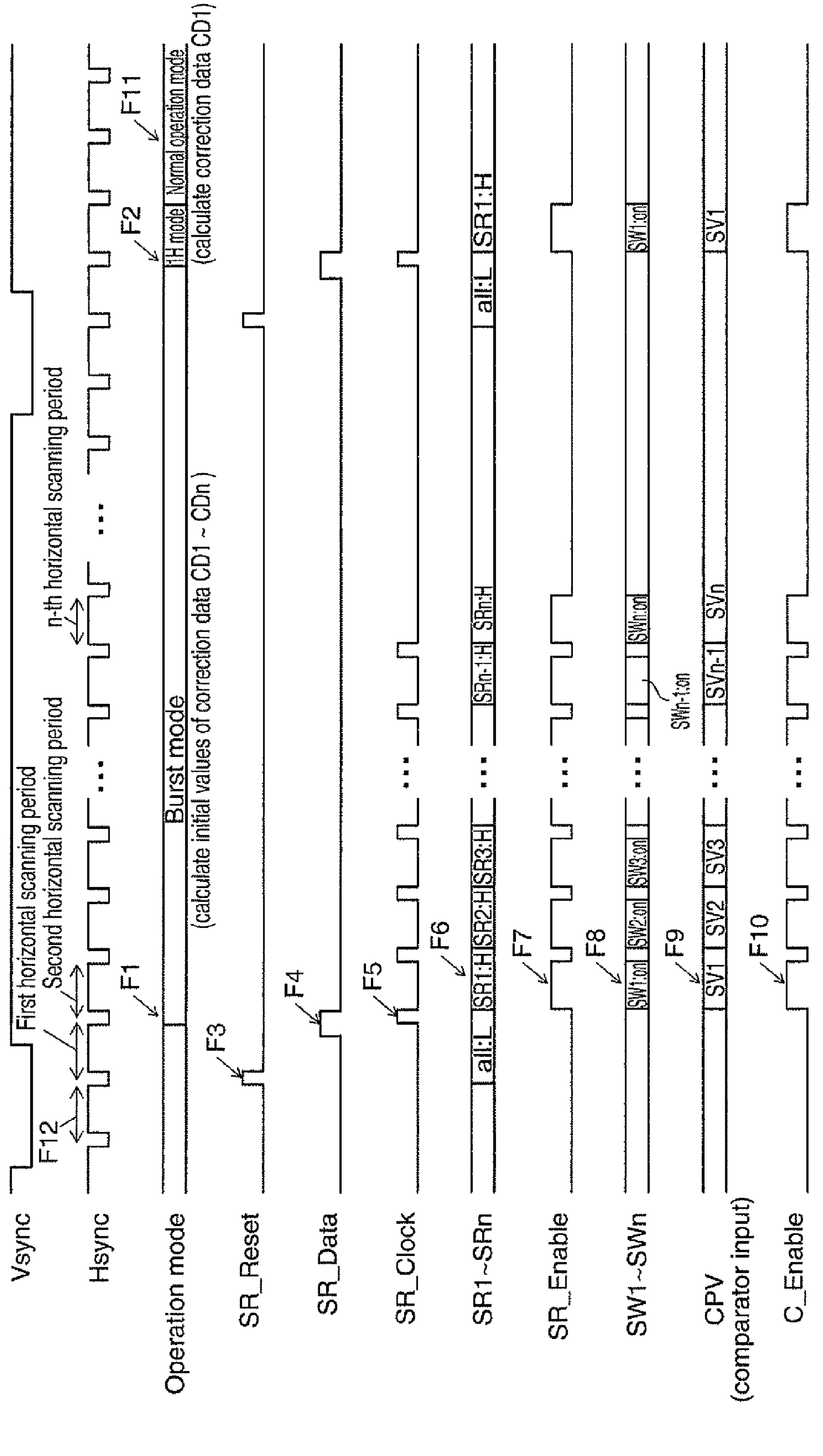
FIG. 11 shows an example of signal waveforms in a burst mode.

FIG. 11 shows an example of signal waveforms in the burst mode (second mode).

In accordance with the present embodiment, initial values of correction data CD1 through CDn are obtained in a batch by executing the burst mode in a display preparation period at the time of starting up the system, switching the display mode, and the like, and the correction data CD1 through CDn are thereafter obtained in real time by executing the 1H mode. Concretely, as indicated by F1 in FIG. 11, initial values of correction data CD1 through CDn are obtained in the burst mode, and the correction data CD1 through CDn are obtained in the 1H mode after the burst mode, as indicated by F2.

In the burst mode shown in FIG. 11, in accordance with the present embodiment, initial values of correction data CD1 through CDn are obtained in the first through n-th horizontal scanning periods among a plurality of horizontal scanning periods.

Concretely, first, as indicated by F3, the control section 100 makes SR_Reset to be active, thereby resetting the shift registers SR1 through SRn.

Next, as indicated by F4, the control section 100 outputs SR_Data at H level (the first logical level), and the shift register SR1 acquires SR_Data at H level, as indicated by F6, by SR_Clock given from the control section 100 as indicated by F5.

As indicated by F7, the control section 100 makes SR_Enable to be active, and the shift register SR1 outputs active switching control signal SRQ1 during the period of SR_Enable being active.

Then, as indicated by F8, the switch SW1 turns ON upon receiving the active switching control signal SRQ1, and a data voltage SV1 is inputted as a comparator input CPI in the comparator 180, as indicated by F9.

As indicated by F10, as the control section 100 makes C_Enable to be active, the data voltage SV1 corresponding to the measurement data MD is outputted to the data voltage supply line S1, and inputted in the comparator 180. The correction data calculation section 102 obtains correction data CD1 upon receiving a comparison result CPQ from the comparator 180, and sets the same as an initial value at the correction data register CDR1.

In this manner, in the first horizontal scanning period in the burst mode, the correction data calculation section 102 obtains the initial value of the correction data CD1. Similarly, in the succeeding second horizontal scanning period, an initial value of correction data CD2 is obtained and set at the correction data register CDR2, and in the n-th horizontal scanning period, an initial value of correction data CDn is obtained and set at the correction data register CDRn. Then, after the initial values of the correction data CD1 through CDn are obtained in the burst mode, the correction data CD1 through CDn are sequentially updated at each vertical scanning period in the 1H mode.

It is noted that the control section 100 does not reset the shift registers SR1 through SRn during horizontal scanning periods in which correction data CD2 through CDn are calculated, and outputs SR_Data at L level (second logical level).

In accordance with an aspect of the present embodiment, in the display preparation period or the non-display period, the data voltage supply lines S1 through Sn may be set to a predetermined data voltage in the first horizontal scanning period among a plurality of horizontal scanning periods, and in the succeeding second horizontal scanning period, the correction data calculation section 102 may obtain correction data.

For example, after the data voltage supply lines S1 through Sn are set to a predetermined data voltage in one horizontal scanning period in a non-display period indicated by E14 in FIG. 10, the 1H mode indicated by E1 may be executed. Alternatively, after the data voltage supply lines S1 through Sn are set to a predetermined data voltage in one horizontal scanning period in the display preparation period indicated by F12 in FIG. 11, the burst mode indicated by F1 may be executed.

It is noted that, for example, when the correction data calculation section 102 sequentially varies the measurement data MD, a voltage within a predetermined range of corresponding data voltages that vary may be set as the predetermined data voltage. For example, the control section 100 may set grayscale data corresponding to a predetermined data voltage at the correction data registers CDR1 through CDRn, and the operational amplifiers OP1 through OPn may output the predetermined data voltage.

Figure 12:
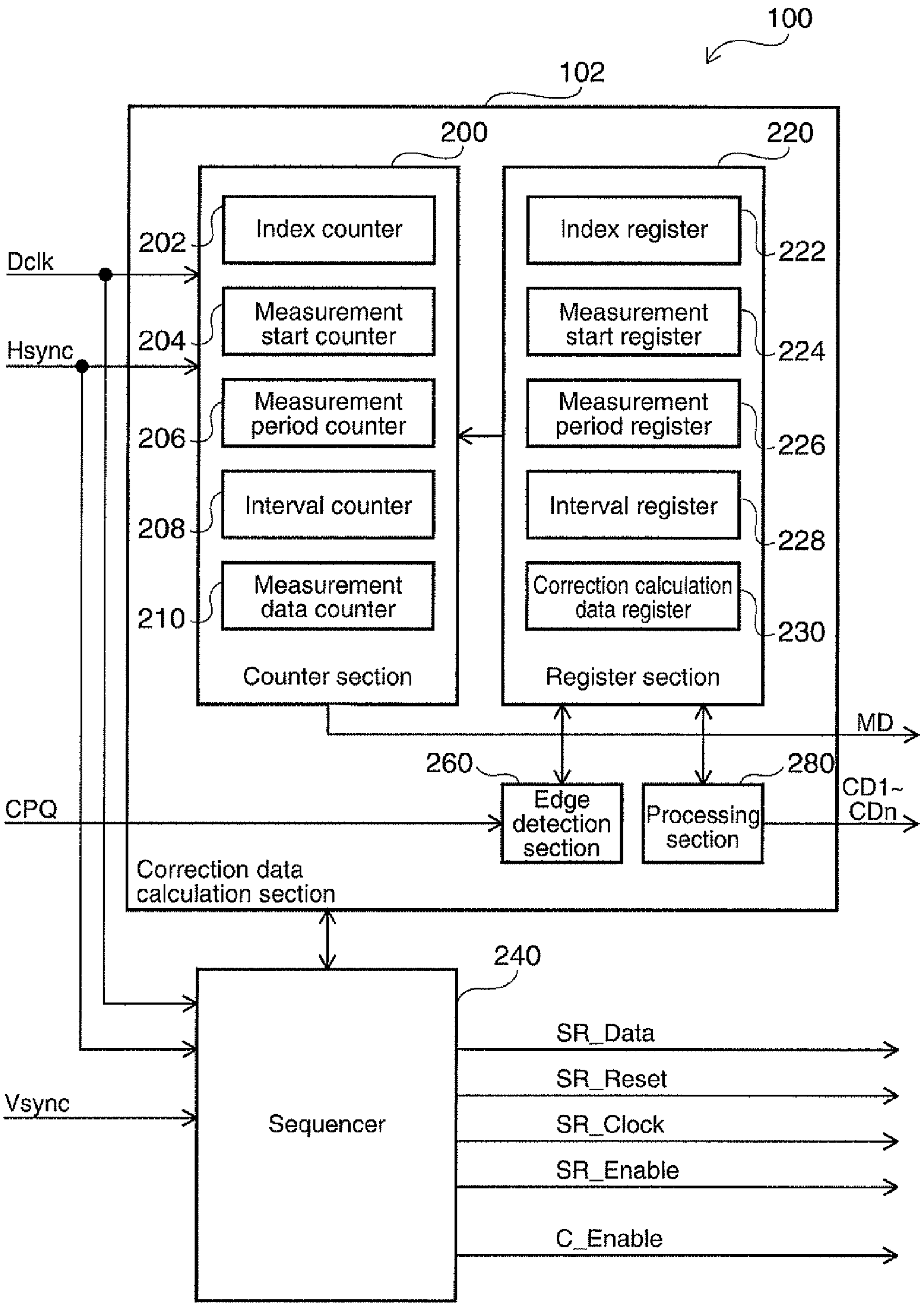
FIG. 12 shows a structure example of a control section and a correction data calculation section in detail.

3.4. Detailed Structure Example of Control Section and Correction Data Calculation Section FIG. 12 shows an example of the structure in detail of the control section and the correction data calculation section. The structure example shown in FIG. 12 includes a correction data calculation section 102 and a sequencer 240. The correction data calculation section 102 includes a counter section 200, a register section 220, an edge detection section 260, and a processing section 280. It is noted that the correction data calculation section 102 in accordance with the present embodiment is not limited to the structure shown in FIG. 12, but many modifications can be implemented in the embodiment, such as, for example, omission of a part of the components (an index register 222, an interval register 228 and the like) and the like.

The counter section 200 includes an index counter 202, a measurement start counter 204, a measurement period counter 206, an interval counter 208 and a measurement data counter 210.

The index counter 202 counts the index that is the number of measurements of corrective calculation data in one horizontal scanning period. For example, the index counter 202 increments the index according to instructions from the sequencer 240.

The measurement start counter 204 counts the measurement start period from a horizontal scanning signal to the start of correction data calculation. As shown in FIG. 3B, the measurement start counter 204 initializes the comparator output in a measurement start period. For example, the measurement start counter 204 counts the measurement start period with a dot clock Dclok.

The measurement period counter 206 counts the measurement period. Concretely, when the correction data calculation section 102 sequentially outputs measurement data MD (measurement grayscale data), the measurement period counter 206 counts the period in which a data voltage for each of the measurement data is compared by the comparator 180, as shown in FIG. 3A. For example, the measurement period counter 206 counts the measurement period with the dot clock Dclk.

The interval counter 208 counts the interval period from the end of one index to the start of the next index. The interval period is a period for initializing outputs (comparison results CPQ) of the comparator 180 (for example, initializing them to L level). For example, the interval counter 208 counts the interval period with the dot clockDclk.

The measurement data counter 210 generates measurement data MD based on count values. For example, the measurement data counter 210 increments the count value at each measurement period according to an instruction from the sequencer 240.

The register section 220 includes an index register 222, a measurement start register 224, a measurement period register 226, an interval register 228, and a corrective calculation data register 230.

The index register 222 sets the index number to be counted by the index counter 202.

The measurement start register 224 sets the measurement start period to be counted by the measurement start counter 204.

The measurement period register 226 sets the measurement period to be counted by the measurement period counter 206.

The interval counter 228 sets the interval period to be counted by the interval counter 208.

For example, register values given from an unshown host controller (CPU) are set at the index register 222, the measurement start register 224, the measurement period register 226, and the interval register 228.

The corrective calculation data register 230 retains corrective calculation data calculated at each index. For example, the corrective calculation data register 230 retains measurement grayscale data given from the measurement data counter 210 upon receiving an edge detection pulse given from the edge detector section 260. Alternatively, the corrective calculation data register 230 retains corrective calculation data, which has undergone correction exceptional processing, given from the processing section 280.

The edge detection section 260 outputs an edge detection pulse upon receiving a comparison result CPQ from the comparator 180. For example, as described with reference to FIG. 3, the edge detection section 260 detects a rising edge (or a falling edge) of the comparison result CPQ, and then outputs an edge detection pulse.

The processing section 280 calculates correction data CD1 through CDn based on corrective calculation data set at each of the indexes retained by the corrective calculation data register 230, and set the same at the correction data registers CDR1 through CDRn. For example, the processing section 280 calculates correction data by averaging corrective calculation data at each of the indexes. Concretely, as the averaging process, the correction data calculation section 102 may perform an addition average, or may weight each of the corrective calculation data, which may then be averaged. Also, the correction data calculation section 102 may perform addition or subtraction of a constant in the averaging process.

Furthermore, the processing section 280 processes corrective calculation data by correction exceptional processing. The processing section 280 can perform multiplication of an adjustment coefficient as the correction exceptional processing. Concretely, as described with reference to FIG. 8 and other figures, measured corrective calculation data is multiplied by a predetermined adjustment coefficient and set at the corrective calculation data register 230. Also, the processing section 280 can perform overflow processing as the correction exceptional processing. Concretely, when it is judged that an overflow occurs in measurement of corrective calculation data, the processing section 280 sets data for overflow at the corrective calculation data register 230. Furthermore, the processing section 280 can perform a processing to limit the change amount as the correction exceptional processing. Concretely, the amount of change in correction data is limited by using, for example, correction data previously retained at the correction data registers CDR1 through CDRn of FIG. 9.

It is noted that, in accordance with the present embodiment, when data lines are alternately driven between a positive polarity period and a negative polarity period in the normal operation mode, the processing section 280 can obtain correction data for positive polarity and correction data for negative polarity from among corrective calculation data. For example, as the correction data for negative polarity, the processing section 280 may use two's complements or one's complements of correction data for positive polarity.

The sequencer 240 receives the vertical synchronization signal Vsync, the horizontal synchronization signal Hsync and the dot clock Dclk, and controls the correction data calculation section 102, and outputs the shift data SR_Data, the reset signal SR_Reset for the shift registers, the clock SR_Clock for the shift registers, the output enable signal SR_Enable for the shift registers, and the correction enable signal C_Enable, as described with reference to FIGS. 9 through 11.

It is noted that the correction data calculation section 102 and the sequencer 240 may be formed from, for example, gate arrays, or may be realized by an unshown CPU executing a program that describes the functions of the correction data calculation section 102 and the sequencer 240.

Figure 13:
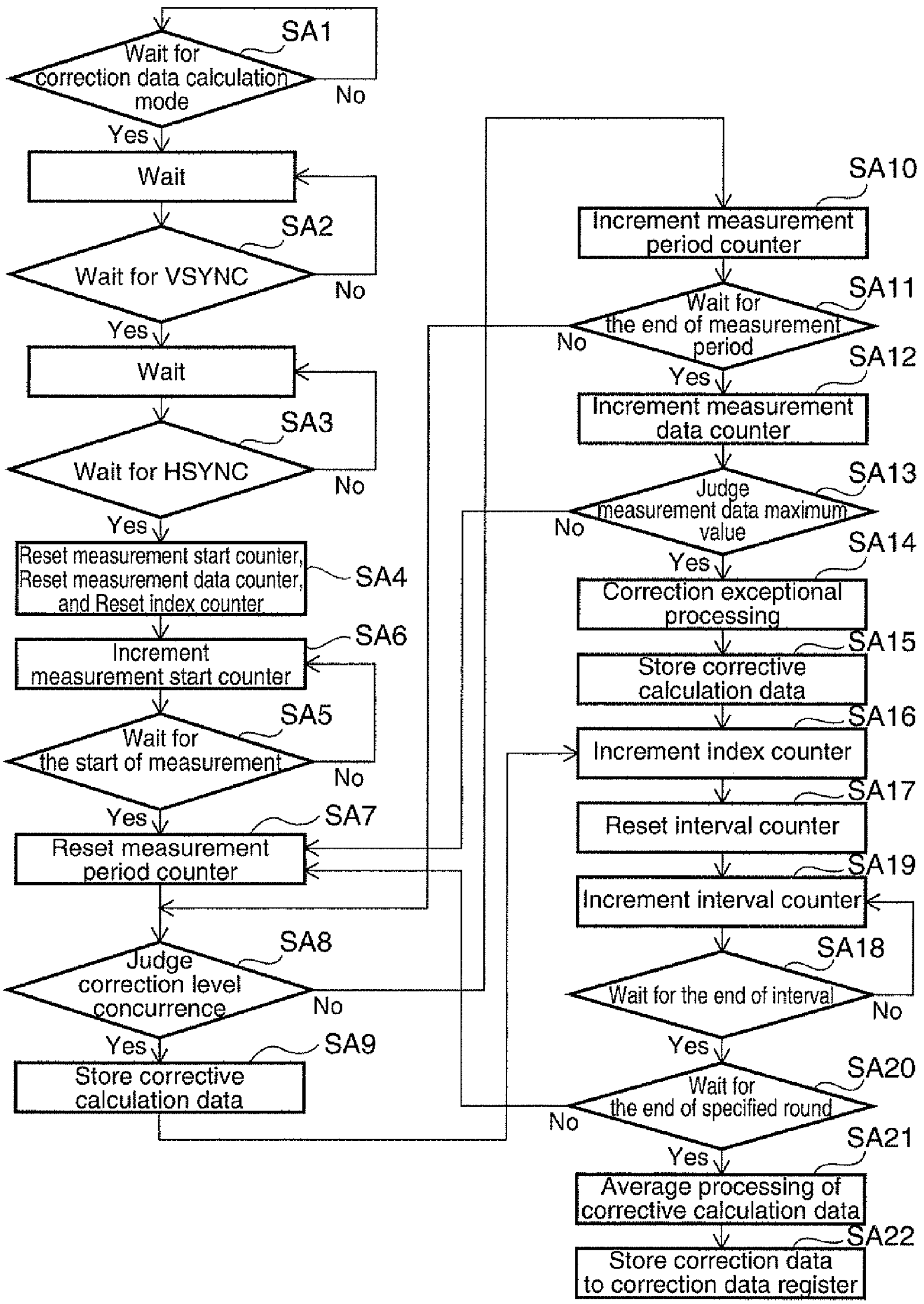
FIG. 13 shows an example of a control flow of the correction data calculation section.

FIG. 13 shows an example of a processing flow of the correction data calculation section 102. Referring to FIG. 13, operations in the 1H mode among the correction data calculation modes shall be described as an example. It is noted that, in the burst mode, the steps in FIG. 13 starting from the step of waiting for correction data calculation mode (step SA1) to the step of storing correction data (step SA22) are processed in a manner similar to the 1H mode, and in the following horizontal scanning period and thereafter, the step of waiting for HSYNC (step SA3) through the step of storing correction data (step SA22) are performed in each of the horizontal scanning periods, which are repeated until the correction data CD1 through CDn are completely obtained.

The correction data calculation section 102, in the step of waiting for correction data calculation mode (SA1), waits for an instruction from the sequencer 240 to start correction data calculation. When No, the step of waiting for correction data calculation mode (SA1) is repeated, and when Yes, the step of waiting for VSYNC (SA2) is executed.

In the step of waiting for VSYNC (SA2), the process waits for an edge (a falling edge or a rising edge) of the vertical synchronization signal Vsync. When No, the step of waiting for VSYNC (SA2) is repeated, and when Yes, the step of waiting for HSYNC (SA3) is executed.

In the step of waiting for HSYNC (SA3), the process waits for an edge (a falling edge or a rising edge) of the horizontal synchronization signal Hsync. When No, the step of waiting for HSYNC (SA3) is repeated, and when Yes, the measurement start counter is reset, and the measurement data counter and the index counter are reset (SA4).

Next, in the step of waiting for the start of measurement (SA5), a judgment is made as to whether the count value set at the measurement start counter concurs or does not concur with the measurement start period set at the measurement start register 224. In the case of non-concurrence (No), the measurement start counter is incremented (SA6), and the step of waiting for the start of measurement (SA5) is repeated. In the case of concurrence (Yes), the measurement period counter is reset (SA7), and the step of correction level concurrence judgment (SA8) is executed.

In the step of correction level concurrence judgment (SA8), a judgment is made based on a comparison result CPQ from the comparator 180 as to whether the data voltage outputted by a data line driving circuit to be corrected concurs or does not concur with the comparator reference voltage VP. In the case of concurrence (Yes), corrective calculation data is set at the corrective calculation data register 230 in the step of storing corrective calculation data (step SA9), the index counter is incremented (SA16), and the steps SA17 through SA22 are executed. In the case of non-concurrence (No), the measurement period counter is incremented (SA10), and the step of waiting for the end of measurement period (SA11) is executed.

In the step of waiting for the end of measurement period (SA11), a judgment is made as to whether the count value of the measurement period counter 206 concurs or does not concur with the measurement period set at the measurement period register 226. In the case of non-concurrence (No), the step of correction level concurrence judgment (SA8) is executed. In the case of concurrence (Yes), the measurement data counter is incremented (SA12), and the step of judging measurement data maximum value (SA13) is executed.

In the step of judging measurement data maximum value (SA13), a judgment is made as to whether the count value of the measurement data counter 210 exceeds a predetermined maximum value (or a minimum value). When it does not exceed (No), the measurement period counter is reset (SA7) and the steps SA8 through SA13 are executed. When it exceeds (Yes), the step of correction exceptional processing (SA14) is executed.

In the step of correction exceptional processing (SA14), the overflow processing, the multiplication of adjustment coefficient, and the limitation of change amount are conducted, and corrective calculation data is set at the corrective calculation data register 230 in the step of storing corrective calculation data (SA15).

Then, the index counter is incremented (SA16).

Then, the interval counter is reset (SA17) and the step of waiting for the end of interval (SA18) is executed.

In the step of waiting for the end of interval (SA18), a judgment is made as to whether the count value of the interval counter concurs or does not concur with the interval period of the interval register 228. In the case of non-concurrence (No), the interval counter is incremented (SA19) and the step of waiting for the end of interval (SA18) is repeated. In the case of concurrence (Yes), the step of waiting for the end of specified round (SA20) is executed.

In the step of waiting for the end of specified round (SA20), a judgment is made as to whether the count value of the index counter 202 concurs or does not concur with the index number set at the index register 222. In the case of non-concurrence (No), the measurement period counter is reset (SA7) and the steps SA8 through SA20 are executed. In the case of concurrence (Yes), an averaging process of corrective calculation data (SA21) is executed, thereby obtaining correction data, and then the correction data is stored (SA22).

In the step of storing correction data (SA22), correction data from the processing section 280 are set at, for example, the correction data registers CDR1 through CDRn shown in FIG. 9.

Figure 14:
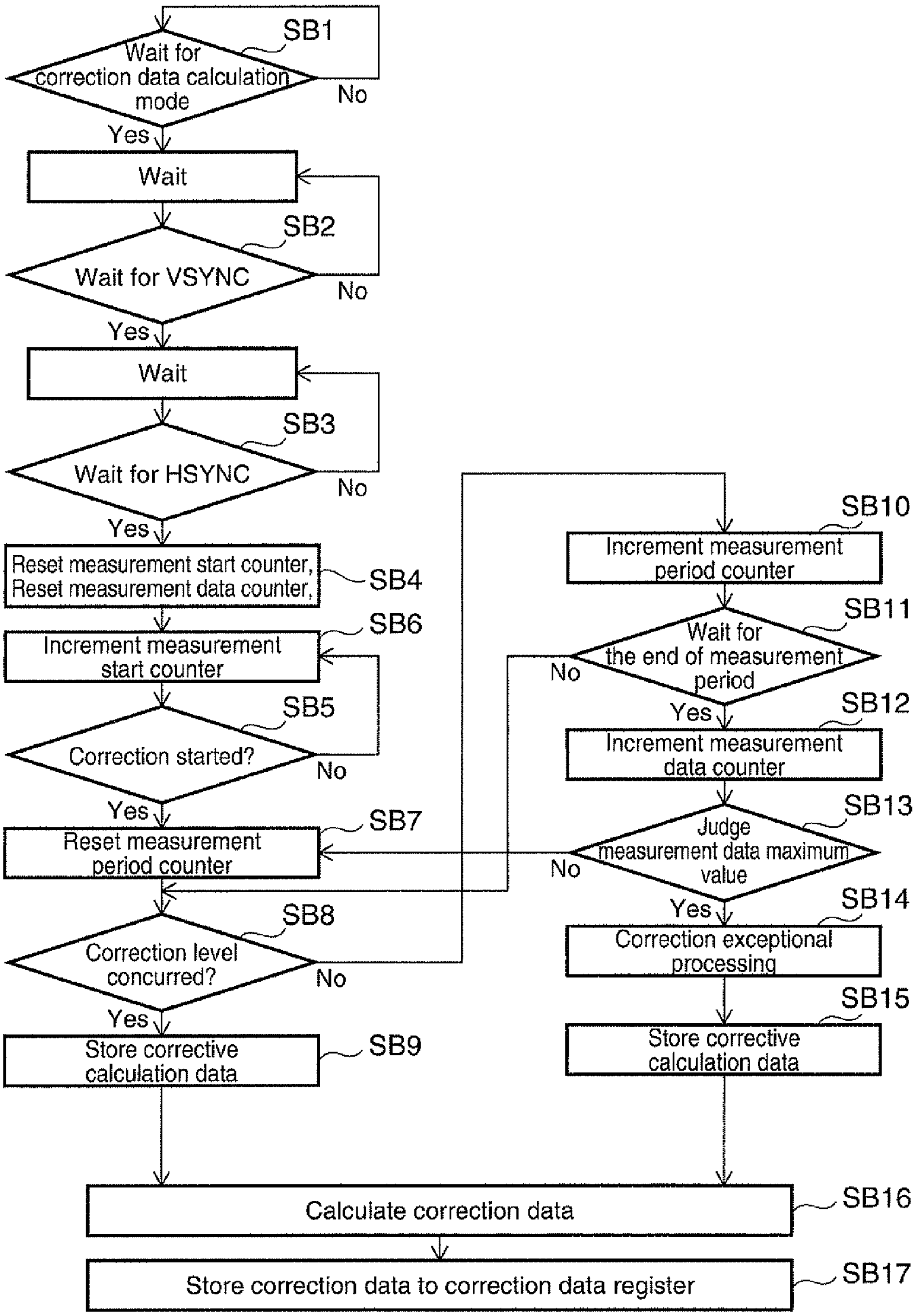
FIG. 14 shows a modified example of the control flow of the correction data calculation section.

FIG. 14 shows a modified example of processing flow of the correction data calculation section 102. The modified example shown in FIG. 14 pertains to an example of processing flow when the present embodiment does not perform multiplex driving. Concretely, it is an example of processing flow in which the present embodiment drives one data line during one horizontal scanning period in the normal operation mode, and obtains one piece of corrective calculation data in one horizontal scanning period in the correction data calculation mode.

It is noted that, in the modified example shown in FIG. 14, the index counter 202, the interval counter 208, the index register 222 and the interval register 228 shown in FIG. 12 may be omitted.

In the modified example shown in FIG. 14, the correction data calculation section 102 executes the step of waiting for correction data calculation mode (SB1). When No, the step of waiting for correction data calculation mode (SB1) is repeated, and when Yes, the step of waiting for VSYNC (SB2) is executed.

In the step of waiting for VSYNC (SB2), when No, the step of waiting for VSYNC (SB2) is repeated, and when Yes, the step of waiting for HSYNC (SB3) is executed.

In the step of waiting for HSYNC (SB3), when No, the step of waiting for HSYNC (SB3) is repeated, and when Yes, the measurement start counter is reset, and the measurement data counter is reset (SB4).

Then, the step of waiting for the start of measurement (SB5) is executed. When No, the measurement start counter is incremented (SB6), and the step of waiting for the start of measurement (SB5) is repeated. When Yes, the measurement period counter is reset (SB7), and the step of correction level concurrence judgment (SB8) is executed.

In the step of correction level concurrence judgment (SB8), in the case of concurrence (Yes), the step of storing corrective calculation data (step SB9) is executed, and correction data is calculated (SB16). In the case of non-concurrence (No), the measurement period counter is incremented (SB10), and the step of waiting for the end of measurement period (SB11) is executed.

In the step of waiting for the end of measurement period (SB11), when No, the step of correction level concurrence judgment (SB8) is executed. When Yes, the measurement data counter is incremented (SB12) and the step of judging measurement data maximum value (SB13) is executed.

In the step of judging measurement data maximum value (SB13), when No, the measurement period counter is reset (SB7) and the steps SB8 through SB13 are executed. When Yes, the step of correction exceptional processing (SB14) is executed, and corrective calculation data is stored (SB15).

Next, in the step of calculating correction data (SB16), the processing section 280 obtains correction data from corrective calculation data. For example, the processing section 280 may use corrective calculation data retained at the corrective calculation data register 230 as the correction data as is, or may obtain the correction data by addition or subtraction of a predetermined constant with respect to the corrective calculation data.

Then the correction data is stored in the correction data register (SB17).

4. Layout

Figure 15:
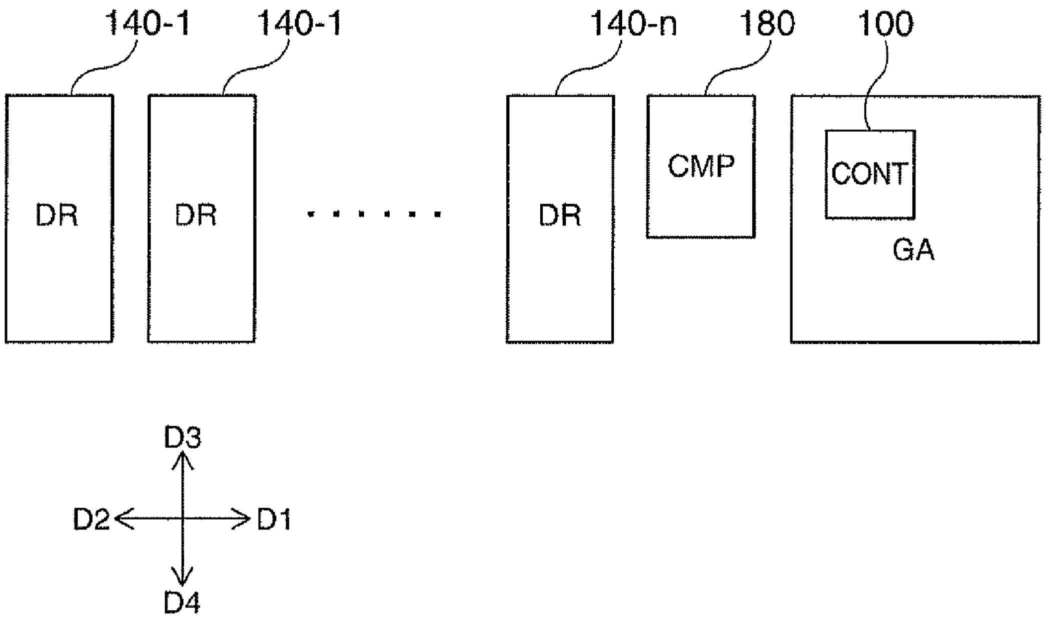
FIG. 15 shows an example of a layout arrangement of the embodiment of the invention.

FIG. 15 schematically shows an example of layout arrangement of the present embodiment. In FIG. 15, the layout arrangement is described, referring to the first direction D1 through the fourth direction D4, wherein an opposite direction of the first direction D1 is defined as the second direction D2, and directions orthogonal to the first direction D1 are defined as the third direction D3 and the fourth direction D4.

The example of layout arrangement shown in FIG. 15 includes data line driving circuits 140-1 through **140-*n* (a plurality of data line driving circuits), and a comparator 180**.

As shown in FIG. 15, the data line driving circuits 140-1 through **140-*n* are arranged along the first direction D1. Then, the comparator 180 is arranged along the first direction D1 of the data line driving circuits 140-1 through 140-*n* (or the second direction D2). Concretely, the data line driving circuits 140-1 through 140-*n* are arranged at equal intervals without including therein other components such as the comparator 180**.

Furthermore, the example of layout arrangement shown in FIG. 14 may include a gate array GA. The gate array GA includes a control section 100 that includes the correction data calculation section 102. Also, the gate array GA may include digital cells for I/F circuits for receiving streamed data, the scanning driver 38 and the like. It is noted that the gate array GA may be arranged in the direction D1 or the direction D2 with respect to the data line driving circuits 140-1 through **140-*n* and the comparator 180. Also, the gate array GA may be arranged in the direction D3 or the direction D4 with respect to the data line driving circuits 140-1 through 140-*n* and the comparator 180**.

If the data line driving circuits 140-1 through **140-*n*** are arranged at unequal intervals, the processing accuracy in processing each of the data line driving circuits would not become uniform. Accordingly, there is a problem in that manufacturing-derived differences would likely occur in the output characteristics of the data line driving circuits, and differences in data line voltages would become substantial.

For example, when data voltages are outputted, using the operational amplifiers OP1 through OPn, as shown in FIG. 9, and if the processing accuracy of the differential pair of each of the operational amplifiers is not uniform, there is a problem in that differences would occur in offsets, and differences in data line voltages would become substantial.

In this respect, in accordance with the present embodiment, the data line driving circuits are arranged along the direction D1, and the comparator 180 is arranged in the direction D1 (or the direction D2) of the data line driving circuits. By this, the data line driving circuits can be arranged at equal intervals, such that differences in data voltages due to manufacturing-derived differences can be suppressed.

Also, in accordance with the present embodiment, differences in data voltages are measured with one comparator. By this, it is not necessary to mix other components among the data line driving circuits, and therefore the data line driving circuits can be arranged at equal intervals.

In this manner, according to the present embodiment, differences in data voltages due to manufacturing-derived differences can be suppressed, and the correction accuracy in correcting differences in data voltages by correction data can be improved.

5. Electronic Equipment 5.1. Projector

Figure 16:
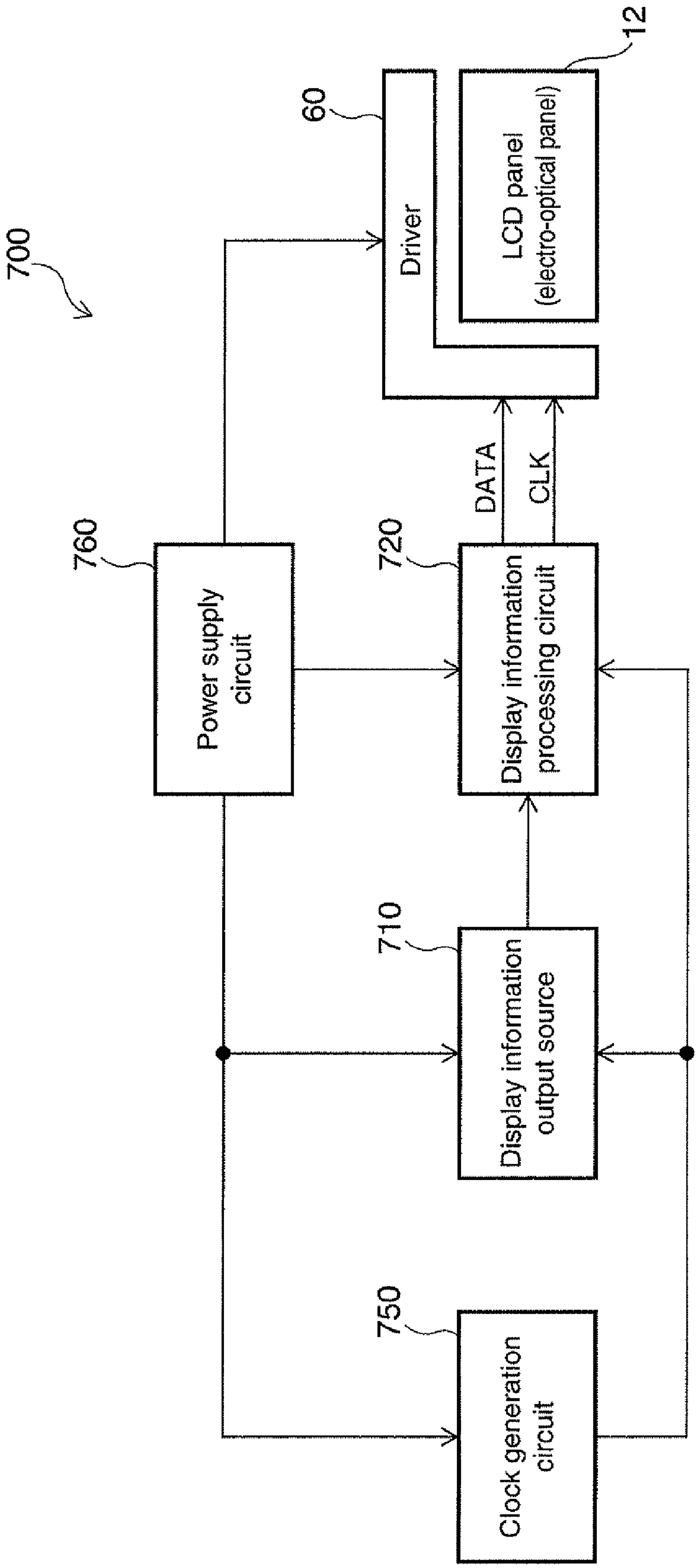
FIG. 16 shows a structure example of a projector.

FIG. 16 shows an example of the structure of a projector (electronic equipment) to which the integrated circuit device in accordance with the present embodiment is applied.

The projector 700 (projection type display device) includes a display information output source 710, a display information processing circuit 720, a driver 60 (display driver), a liquid crystal panel 12 (an electro-optical panel in a broader sense), a clock generation circuit 750 and a power supply circuit 760.

The display information output source 710 includes a memory device, such as, a read only memory (ROM), a random access memory (RAM), an optical disc or the like, and a tuning circuit for tuning and outputting an image signal. The display information output source 710 outputs display information such as image signal in a predetermined format and the like to the display information processing circuit 720 based on a clock signal given from the clock generation circuit 750.

The display information processing circuit 720 may include an amplification-polarity inversion circuit, a phase expansion circuit, a rotation circuit, a gamma correction circuit, a clamping circuit, and the like.

The driver 60 includes a scanning driver (a gate driver) and a data driver (a source driver), and drives the liquid crystal panel 12 (an electro-optical panel).

The power supply circuit 760 supplies power to each of the circuits described above.

5.2. PDA

Figure 17:
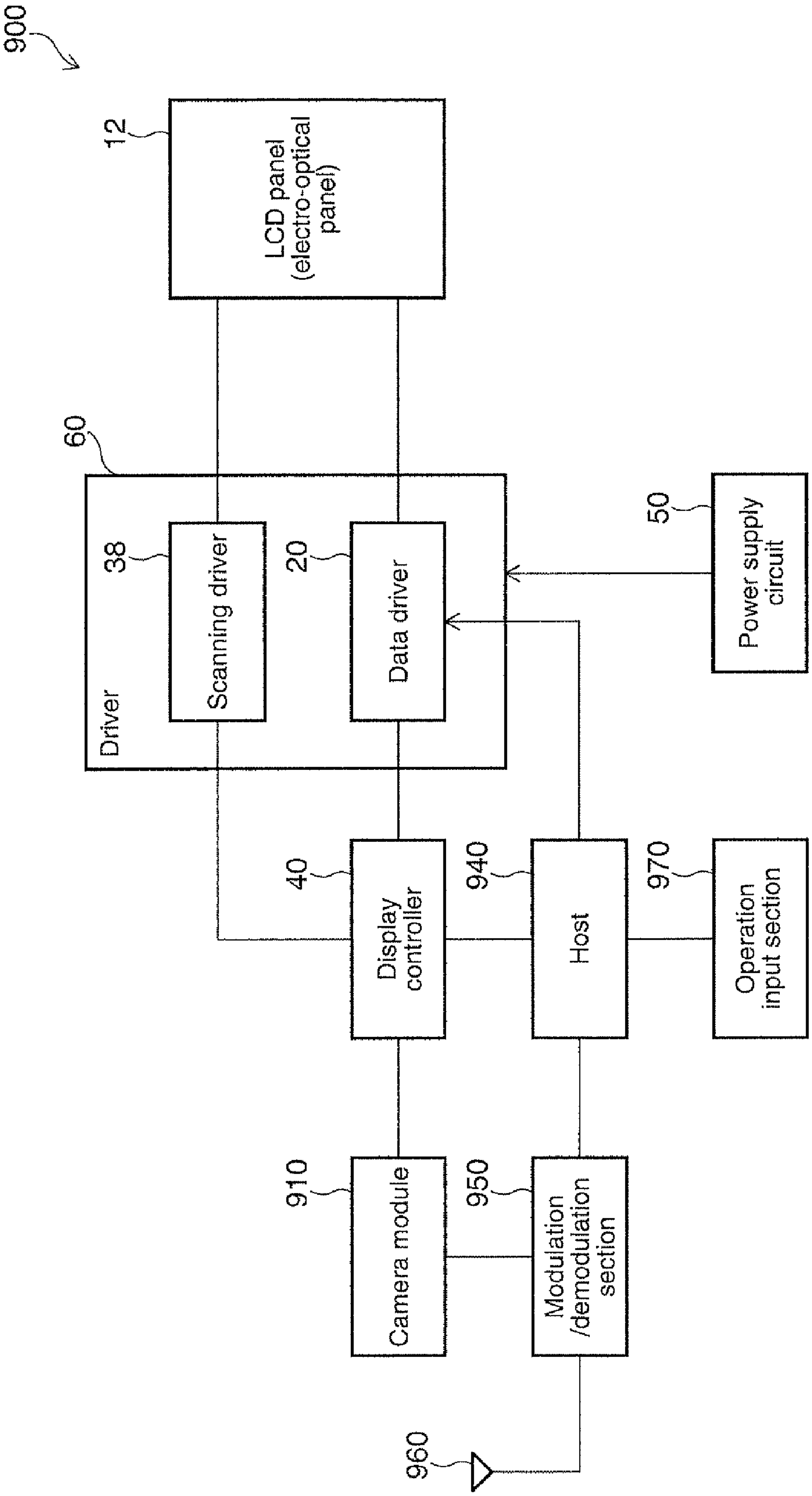
FIG. 17 shows a structure example of a PDA.

FIG. 17 shows an example of the structure of a PDA (electronic equipment) to which the integrated circuit device in accordance with the present embodiment is applied.

A personal digital assistants (PDA) 900 includes a camera module 910, a modulation/demodulation section 950, a display controller 40, a host 940 (a host controller, a CPU), an operation input section 970, a driver 60 (a display driver), a power supply circuit 50, and a liquid crystal panel 12 (an electro-optical panel).

The camera module 910 includes a CCD camera, and supplies picture data imaged by the CCD camera to the display controller 40 in, for example, a YUV format.

The driver 60 includes a scanning driver 38 (a gate driver), and a data driver 20 (a source driver). The scanning driver 38 drives a plurality of scanning lines (gate lines) of the liquid crystal panel 12. The data driver 20 drives a plurality of data lines (source lines) of the liquid crystal panel 12.

The display controller 40 supplies, for example, grayscale data in a RGB format to the data driver 20, and supplies, for example, a horizontal synchronization signal to the scanning driver 38.

The power supply circuit 50 supplies a power supply voltage for driving to the source driver 20 and the gate driver 38. Also, the power supply circuit 50 supplies a counter electrode voltage VCOM to the counter electrodes of the display panel 12.

The host 940 controls the display controller 40. The host 940 also controls the modulation/demodulation section 950 to demodulate a modulation signal received through the antenna 960 thereby generating grayscale data, and supplies the same to the display controller 40. The host 940 controls the modulation/demodulation section 950 to modulate grayscale data generated by the camera module 910, and instructs to transmit the same to another communication device through the antenna 960. Furthermore, the host 940 performs, based on operation information given from the operation input section 970, transmission and reception processing of grayscale data, imaging by the camera module 910, and display processing by the display panel 12.

It is noted that, although some embodiments of the invention have been described in detail above, those skilled in the art would readily appreciate that many modifications are possible in the embodiments without substantively departing from the novel matter and effects of the invention. Accordingly, such modifications are deemed to be included within the scope of the invention. For example, throughout the specification and the drawings, terms (electro-optical panel, inversion input terminal, non-inversion input terminal, grayscale voltage, VGMH, MGML and the like) described at least once with bracketed different terms that are in a broader sense or synonymous can be replaced with these different terms in any sections of the specification and the drawings. Also, the structures and operations of the reference voltage generation circuit, the selection circuit, the sample hold section, the data line driving circuit, the grayscale generation amplifier, the driving amplifier, the electro-optical device, the electronic equipment are not limited to those described in the present embodiment, and many modifications can be made.

What is claimed is:

1. An integrated circuit device comprising:

a plurality of data line driving circuits that drive a plurality of data voltage supply lines; and a correction data calculation section that obtains correction data for correcting differences in data voltages outputted from the plurality of data line driving circuits, wherein the correction data calculation section executes, in one horizontal scanning period in a non-display period in a vertical scanning period, a first mode to obtain the correction data corresponding to a data line driving circuit to be corrected among the plurality of data line driving circuits.

2. An integrated circuit device according to claim 1, comprising a plurality of correction circuits, each of which corrects image data based on the correction data given from the correction data calculation section, and outputs the image data that has been correction-processed to a corresponding data line driving circuit among the plurality of data line driving circuits.

3. An integrated circuit device according to claim 2, wherein the plurality of correction circuits include correction data registers for retaining the correction data given from the correction data calculation section, wherein initial values of the correction data corresponding to the plurality of data line driving circuits are set at the correction data registers before execution of the first mode, and the plurality of correction circuits correct the image data based on the initial values of the correction data.

4. An integrated circuit device according to claim 3, wherein the correction data calculation section executes, in a display preparation period, a second mode in which the initial values of the correction data corresponding to the plurality of data line driving circuits are obtained in a batch and set at the correction data registers, and executes the first mode after executing the second mode.

5. An integrated circuit device according to claim 4, wherein the correction data calculation section obtains the initial values of the correction data in a batch by executing the second mode at the time of system startup.

6. An integrated circuit device according to claim 4, wherein the correction data calculation section executes the second mode to obtain the initial values of the correction data in a batch at the time of switching a display mode.

7. An integrated circuit device according to claim 2, wherein, in the first mode and the second mode, the correction data calculation section sequentially changes measurement data and outputs the measurement data to the data line driving circuit to be corrected, the data line driving circuit to be corrected outputs data voltages corresponding to the measurement data, and the correction data calculation section obtains the correction data based on the data voltages corresponding to the measurement data, and in a normal operation mode, the correction circuit corrects image data based on the correction data and outputs correction-processed image data to the corresponding data line driving circuit among the plurality of data line driving circuits.

8. An integrated circuit device according to claim 2, wherein the correction data calculation section, in the first mode or the second mode, multiplies the obtained correction data by an adjustment coefficient to obtain coefficient-multiplied correction data, and the plurality of correction circuits, in the normal operation mode, correct image data based on the coefficient-multiplied correction data.

9. An integrated circuit device according to claim 2, wherein the correction data calculation section uses, in the first mode, presently obtained correction data and previously obtained correction data for the data line driving circuit to be corrected, to obtain correction data to be outputted to a correction circuit corresponding to the data line driving circuit to be corrected among the plurality of correction circuits.

10. An integrated circuit device according to claim 9, wherein, when the presently obtained correction data is greater than the previously obtained correction data, the correction data calculation section adds a predetermined positive value to the previously obtained correction data to obtain the correction data, and when the presently obtained correction data is smaller than the previously obtained correction data, the correction data calculation section adds a predetermined negative value to the previously obtained correction data to obtain the correction data to be outputted to the correction circuit.

11. An integrated circuit device according to claim 1, wherein, in the first horizontal scanning period among a plurality of horizontal scanning periods in the non-display period or the display preparation period, the plurality of data voltage supply lines are set at a predetermined voltage, and in the second horizontal scanning period succeeding the first horizontal scanning period among the plurality of horizontal scanning periods in the non-display period or the display preparation period, the correction data calculation section obtains the correction data.

12. An electronic equipment comprising the integrated circuit device set forth in claim 1.

* * * * *